United States Patent
Alameh et al.

(10) Patent No.: US 11,620,366 B2
(45) Date of Patent: Apr. 4, 2023

(54) DEVICE ENABLING USER PREFERRED FUNCTIONS, PREFERENCES, AND SETTINGS IN ANOTHER ELECTRONIC DEVICE AND CORRESPONDING METHODS

(71) Applicant: Motorola Mobility LLC, Chicago, IL (US)

(72) Inventors: Rachid Alameh, Crystal Lake, IL (US); John Corsica, Round Lake, IL (US); Jarrett Simerson, Glenview, IL (US); Robert Witte, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 583 days.

(21) Appl. No.: 16/703,664

(22) Filed: Dec. 4, 2019

(65) Prior Publication Data
US 2021/0173909 A1    Jun. 10, 2021

(51) Int. Cl.
*G06F 21/00* (2013.01)
*G06F 21/32* (2013.01)
*H04L 9/40* (2022.01)
*G06F 21/34* (2013.01)
*G06F 21/83* (2013.01)

(52) U.S. Cl.
CPC ............. *G06F 21/32* (2013.01); *G06F 21/34* (2013.01); *G06F 21/83* (2013.01); *H04L 63/0861* (2013.01)

(58) Field of Classification Search
CPC .......... G06F 21/32; G06F 21/34; G06F 21/83; H04L 63/0861
See application file for complete search history.

(56) References Cited

U.S. PATENT DOCUMENTS

| | | | |
|---|---|---|---|
| 5,848,231 A | 12/1998 | Teitelbaum et al. | |
| 6,926,199 B2* | 8/2005 | Jay | G06F 9/4451 235/375 |
| 7,599,684 B2 | 10/2009 | Kim | |
| 8,255,697 B2 | 8/2012 | Mathiassen et al. | |
| 9,391,988 B2 | 7/2016 | Cronin | |
| 9,760,383 B2 | 9/2017 | DiVincent et al. | |
| 10,291,624 B1* | 5/2019 | Cronin | H04W 12/06 |

(Continued)

OTHER PUBLICATIONS

Zamam, Faisal M., "Non-Final Office Action", U.S. Appl. No. 16/703,670, filed Dec. 4, 2019; dated Aug. 25, 2021.

(Continued)

*Primary Examiner* — Jeffrey C Pwu
*Assistant Examiner* — William A Corum, Jr.
(74) *Attorney, Agent, or Firm* — Philip H. Burrus, IV

(57) ABSTRACT

A companion electronic device includes a communication interface, one or more processors operable with the communication interface, and an authentication device operable with the one or more processors. The one or more processors can be actuated by power received from the communication interface upon the communication interface establishing electronic communication with another electronic device. The one or more processors can delivering signals to the communication interface enabling one or more functions of the other electronic device upon confirming authentication data received by the authentication device after the one or more processors are actuated belongs to an authorized user of the companion electronic device.

20 Claims, 8 Drawing Sheets

(56) References Cited

U.S. PATENT DOCUMENTS

| | | | |
|---|---|---|---|
| 10,475,105 B1 | 11/2019 | Anderson et al. | |
| 2002/0089410 A1 | 7/2002 | Janiak et al. | |
| 2002/0099934 A1 | 7/2002 | Cromer et al. | |
| 2003/0120750 A1 | 6/2003 | Gaxiola et al. | |
| 2004/0128389 A1* | 7/2004 | Kopchik | G06F 21/34 709/228 |
| 2005/0108642 A1 | 5/2005 | Sinclair et al. | |
| 2005/0210271 A1 | 9/2005 | Chou et al. | |
| 2006/0250213 A1* | 11/2006 | Cain, Jr. | G06F 21/85 340/5.52 |
| 2009/0132962 A1 | 5/2009 | Soemantri | |
| 2009/0307380 A1 | 12/2009 | Lee et al. | |
| 2009/0319782 A1* | 12/2009 | Lee | G06F 21/575 713/156 |
| 2010/0186078 A1* | 7/2010 | Napoli | H04L 9/3231 726/9 |
| 2014/0101434 A1* | 4/2014 | Senthurpandi | G06F 21/32 713/150 |
| 2015/0189059 A1 | 7/2015 | Shen | |
| 2015/0205622 A1* | 7/2015 | DiVincent | G06F 9/4451 713/100 |
| 2015/0332035 A1* | 11/2015 | Hama | G06F 21/34 726/16 |
| 2017/0109448 A1 | 4/2017 | Adamy et al. | |
| 2017/0206398 A1* | 7/2017 | Kim | G06F 21/32 |
| 2017/0228582 A1* | 8/2017 | Li | G06F 3/0488 |
| 2017/0311117 A1 | 10/2017 | Rivas | |
| 2018/0020349 A1* | 1/2018 | Tyagi | H04L 63/083 |
| 2021/0009081 A1* | 1/2021 | Wang | G06K 9/0012 |
| 2021/0019278 A1* | 1/2021 | Hulbert | G06F 3/04842 |
| 2021/0173667 A1* | 6/2021 | Alameh | G06F 21/32 |

OTHER PUBLICATIONS

"Adobe Creative Cloud—Help", How to Sync application setting with Creative Cloud; Viewed online Dec. 5, 2019 at https://helpx.adobe.com/creative-cloud/help/sync-settings.html; unknown publication date but prior to filing of present application.

"Everything you ever wanted to know about SIM cards", Published Sep. 11, 2016 at http://www.three.co.uk/hub/sim-card-answers/.

"How can I encrypt or decrypt my microSD card?", Samsung support; Published on Aug. 2, 2018; Viewed online Dec. 5, 2019 at https://www.samsung.com/au/support/mobile-devices/how-to-encrypt-decrypt-sd-card/.

"Safely Removing a Flash Drive", Help Article on Centon; Published on or before filing of present application; viewed online at http://www.centon.com/support/59-safely-removing-a-flash-drive.

"Security Flash Drive USB 2.0, Biometric Fingerprint Reader, 32GB", Made by Lab C; Product available on Amazon; Viewed online Dec. 5, 2019 at https://www.amazon.com/Security-Flash-Biometric-Fingerprint-Reader/dp/B01D45Y2VU ; Unknown first availability date but prior to filing of present application.

"Use Chromebook as a guest", Google Support; Unknown publication but prior to filing of present application; viewed online Dec. 5, 2019 at https://support.google.com/chromebook/answer/1057090?hl=en.

Fitzpatrick, Jason , "USBFlashCopy Automatically Identifies and Backs up Your Flash Drive", Article published online Sep. 17, 2010 at https://lifehacker.com/usbflashcopy-automatically-identifies-and-backs-up-your-564080.

Zamam, Faisal M. , "Non-FInal Office Action", U.S. Appl. No. 16/703,670, filed Dec. 4, 2019; dated Feb. 5, 2021.

Zamam, Faisal M. , "Final Office Action", U.S. Appl. No. 16/703,670, filed Dec. 4, 2019; dated Apr. 19, 2021.

* cited by examiner

DEVICE ENABLING USER PREFERRED FUNCTIONS, PREFERENCES, AND SETTINGS IN ANOTHER ELECTRONIC DEVICE AND CORRESPONDING METHODS

BACKGROUND

Technical Field

This disclosure relates generally to electronic devices, and more particularly to electronic devices having data communication capabilities.

Background Art

Modern electronic devices such as laptop computers, smartphones, tablet computers, and smart watches, are configurable in that a user can select what applications to run on the device, what data should be stored on the device, how information should be presented on the device, how information should be shared with other devices, and so forth. Since the ways in which such devices can be configured borders on the infinite, manually configuring a device as desired is a time consuming process. It would be advantageous to have devices and methods offering a more streamlined and efficient personal configuration process for electronic devices.

Figure 1:
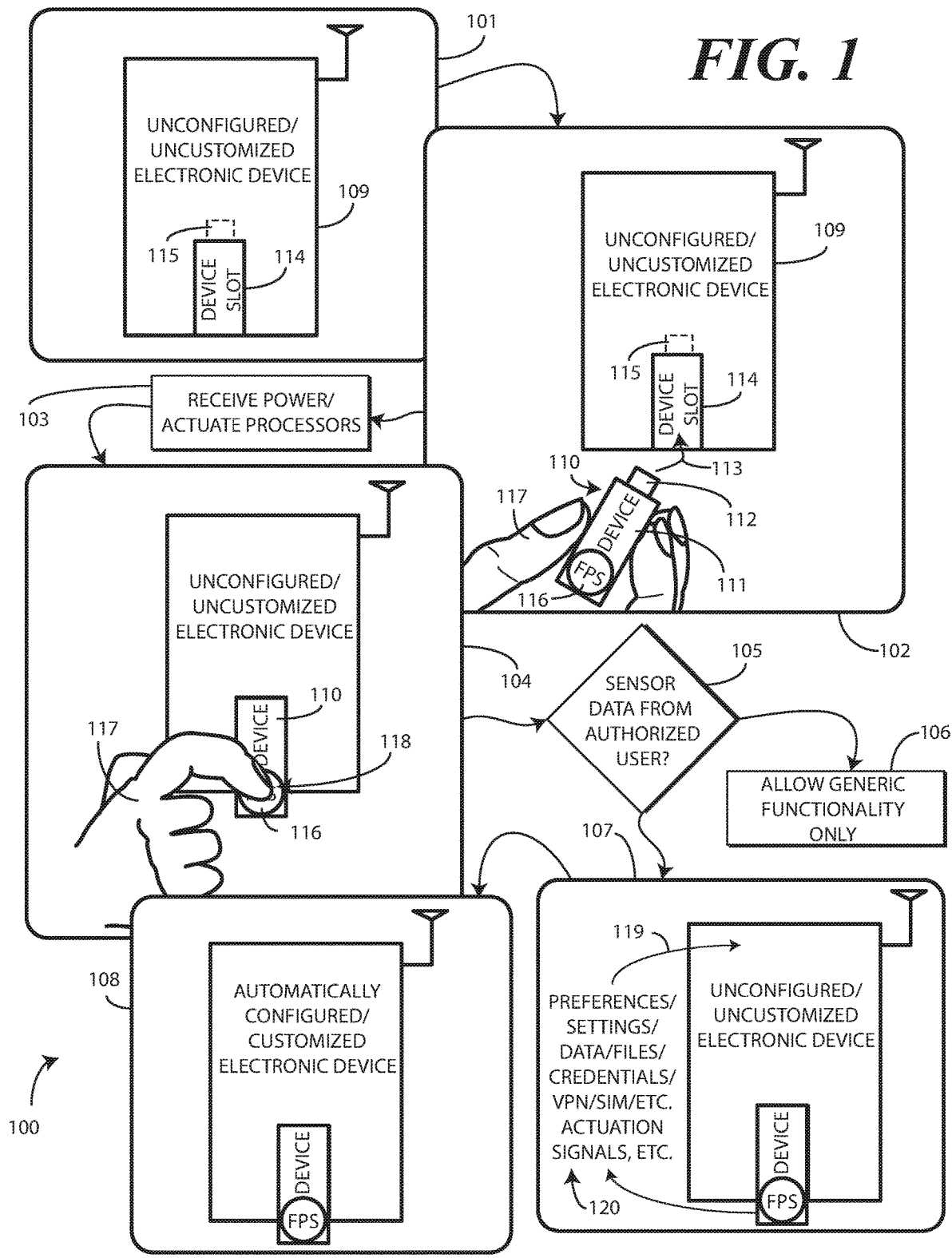
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to automatically enabling one or more functions of another electronic device, as well as configuring the other electronic device with one or more preferences, contexts, device settings, font sizes, ringtone preferences, and so forth. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of delivering data, information, preferences, application operating states, and other information to configure another electronic device as described herein. The non-processor circuits may include, but are not limited to, a radio receiver, a radio transmitter, signal drivers, clock circuits, power source circuits, and user input devices. As such, these functions may be interpreted as steps of a method to perform automatic configuration of another electronic device with secure and encrypted files, virtual private network (VPN) connection preferences and credentials, subscriber identification module (SIM) profile information allowing the other device to make and receive voice calls, send text messages, and use a data plan belonging to an authorized user. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide devices, methods, and systems that allow a person to pick up a new or otherwise unconfigured electronic device, such as a smartphone, tablet computer, laptop computer, or other electronic device, and have it instantly and automatically be configured with all of their information, settings, applications, files, pictures, songs, font size preferences, and other configuration preferences. Illustrating by example, using the devices, methods, and systems of the present disclosure, a person entering a hotel room would be able to automatically and instantly configure a smart television in the hotel room with their content, channel, and subscription preferences.

In one or more embodiments, a device includes a communication interface, which can be a physical communication interface such as a connector, or alternatively a wireless communication interface. One or more processors are operable with the communication interface. A fingerprint sensor, keypad, imager, depth sensor, or other authentication device, is then operable with the one or more processors as well.

In one or more embodiments, when the device is operatively coupled with another electronic device, such as a smartphone, the one or more processors are actuated by power received from the other electronic device through the communication interface when the communication interface establishes electronic communication with the other electronic device. If, for example, the communication interface is a physical communication interface, such as a universal serial bus (USB) connector, in one or more embodiments the one or more processors are actuated by power received from the universal serial bus connector when the universal serial bus connector is coupled to another electronic device. In another embodiment, where the communication interface is a wireless communication interface, the one or more processors can be actuated by wireless power received from the communication interface when electronic communication is established with the other electronic device, and so forth.

In one or more embodiments, the one or more processors receive, at the authentication device, authentication data. If the authentication device is a fingerprint sensor, this can comprise receiving fingerprint data at the fingerprint sensor. If the authentication device is a depth imager, this can comprise receiving a facial depth scan of a person with the depth imager. If the authentication device is a keypad, this can comprise receiving a personal identification number (PIN), and so forth.

In one or more embodiments, the one or more processors then automatically deliver, from an encrypted memory upon confirming that the authentication data was received from an authorized user of the device, one or more user preferences to the communication interface. In one or more embodiments, the one or more user preferences enable one or more functions of the other electronic device so long as power is being delivered to the one or more processors of the electronic device enabling those functions.

Illustrating by example, in one or more embodiments the device is configured as a small, handheld companion electronic device that an authorized user can conveniently carry in a pocket, on a lanyard around their neck, or attached to a bracelet. Where the communication interface is a physical interface, such as a universal serial bus connector, secure digital (SD) card interface, high-definition multimedia (HDMI) connector, or other connector, the person can then couple the connector to the other electronic device to actuate the one or more processors of the companion electronic device and initiate electronic communication between the companion electronic device and the other electronic device. Where the communication interface is a wireless interface, such as a near-field communication interface, a wireless fidelity (Wi-Fi.) interface, a Bluetooth interface, or other wireless interface, the person can physically touch the companion electronic device to the other electronic device to actuate the one or more processors of the companion electronic device and initiate electronic communication between the companion electronic device and the other electronic device, and so forth.

In one or more embodiments, the companion electronic device includes an encrypted memory that is operable with the one or more processors. In one or more embodiments, the encrypted memory stores one or more user-preferred settings for one or more functions of the other electronic device. For example, the encrypted memory of the companion electronic device can store data, information, and preferences that the other electronic device can load. Additionally, the encrypted memory can store files, preferences, and applications preferred by the user.

Other data can be stored in the encrypted memory as well. For instance, in one or more embodiments the encrypted memory comprises virtual private network communication preferences and credentials for communication with other electronic devices across a network. The encrypted memory could store user preference information such as ringtone preferences, font size preferences, screen brightness preferences, audio setting preferences, call handling preferences, data handling preferences, application suite preferences, or other information. The encrypted memory could store preferred electronic devices to connect to, preferred power modes of operation, preferred authenticating technologies, preferred presence scanning duty cycles, preferred methods of connection, and so forth.

The encrypted memory could also store subscriber identification module information that allows the other electronic device to transmit and receive voice calls, transmit and receive text messages, and otherwise use data from a subscription plan purchased by the authorized user of the companion electronic device. The encrypted memory could also store credentials to access services in the "cloud." For example, the credentials stored in the encrypted memory could allow the other electronic device to access to accounts, application, data, and services stored on a remote server across a network in one or more embodiments. These examples of what can be stored in the encrypted memory are illustrative only. Numerous others will be obvious to those of ordinary skill in the art having the benefit of this disclosure.

In one or more embodiments, upon the authentication device verifying that the authentication data was received from an authorized user of the companion electronic device, the one or more processors of the companion electronic device can deliver signals to the communication interface enabling one or more functions of the electronic device. If, for example, a preferred application is a wine label searching application, in one or more embodiments the one or more processors of the companion electronic device can automatically deliver signals to the other electronic device upon confirming the authentication data received by the authentication device is from an authorized user that cause the other electronic device to download the wine label searching application, install it on the other electronic device, and launch the application. The signals may also cause the wine label searching application to download a catalog of wine labels the authorized user has already searched from a could server so that the wine label searching application is preconfigured with the authorized user's preferences, history, and data upon launch.

By doing the same with each preference, file, application, user setting, device setting, or other preference, coupling the companion electronic device to the other electronic device automatically configures the other electronic device as desired by an authorized user in a seamless and effortless manner. In one or more embodiments, upon authenticating the user, the companion electronic device enables communication of user information, user settings, user applications and application suites, device settings, and so forth to configure the other electronic device with a predefined user-preferred configuration. In one embodiment, this exchange of one or more user-preferred settings occurs without any additional input from the person coupling the companion electronic device to the other electronic device. In this manner, the communication between the companion electronic device and the other electronic device to configure the other electronic device appears seamless and instant. To the user, "it just works."

In one or more embodiments, when the person then removes the companion electronic device from the other electronic device, e.g., by decoupling the physical connector of the companion electronic device from the other electronic device where the communication interface of the companion electronic device is a physical interface, or alternatively by moving the companion electronic device sufficiently far away from the other electronic device such that communication ceases across the communication interface, the one or more processors of the companion electronic device detect the ejection event and deliver one or more signals causing deletion of any and all user preferred settings, data, files, preferences, applications, application suites, and so forth upon the ejection event discontinuing electronic communication with the other electronic device across the user interface. In one or more embodiments, this causes the other electronic device to return to its original state by "wiping" the user preferred settings, data, files, preferences, applications, application suites, and so forth before the companion electronic device automatically performed its configuration.

Optionally, prior to doing so, the one or more processors can detect, from other signals received from the communication interface, that the one or more user preferred settings have been altered on the other electronic device. In one or more embodiments, the one or more processors update the encrypted memory with the alterations of the user preferred settings, data, files, preferences, applications, application suites, and so forth prior to causing the same information to be wiped. In one or more embodiments, removing the companion electronic device from the other electronic device forces the encrypted memory to be updated with the user preferred settings, data, files, preferences, applications, application suites, and so forth from the other electronic device. In one or more embodiments, the user can cause an archive of the user preferred settings, data, files, preferences, applications, application suites, and so forth to remain on the other electronic device, serving as a back-up of the data in the event the companion electronic device is lost or stolen.

In one or more embodiments, when the companion electronic device is operatively coupled to the other electronic device and the authentication device is unable to verify that received authentication data belongs to an authorized user of the companion electronic device, the other electronic device can still be used. However, in such situations whoever is using the other electronic device would be treated as a guest user, and would be unable to use, access, or see any user preferred settings, data, files, preferences, applications, application suites, and so forth of the authorized user of the companion electronic device. Thus, where the other electronic device includes one or more generic functions that are operable without access to any of the user preferred settings, data, files, preferences, applications, application suites, and so forth, the one or more processors of the companion electronic device cause only the one or more generic functions to be operable when they fail to identify authentication data, be it fingerprint data or other authentication data, as belonging to an authorized user of the companion electronic device.

Thus, embodiments of the disclosure provide a companion electronic device that stores user preferred settings, data, files, preferences, applications, application suites, and so forth for electronic device operating sessions. In one or more embodiments, these one or more user preferred settings are protected by an authentication device, which could be a fingerprint sensor, other biometric sensor, keypad, or other device. Upon an authorized user delivering authorization data to the authorization device, e.g., delivering fingerprint data to a fingerprint sensor, and upon coupling the companion electronic device to the other electronic device by physically connecting a connector of a physical interface or placing the companion electronic device close enough for a wireless communication interface to establish communication with the other electronic device, the user preferred settings, data, files, preferences, applications, application suites, and so forth are unlocked and delivered to the other electronic device.

When the companion electronic device is ejected from the other electronic device, in one or more embodiments the one or more processors of the companion electronic device first copy any alterations/changes to the user preferred settings, data, files, preferences, applications, application suites, and so forth back to the encrypted memory of the companion electronic device. In one or more embodiments, the one or more processors also, upon detecting the ejection event, cause any user preferred settings, data, files, preferences, applications, application suites, and so forth to be expunged from the other electronic device.

Where the other electronic device is not a public electronic device or is designated as belonging to the authorized user of the companion electronic device, in one or more embodiments the user preferred settings, data, files, preferences, applications, application suites, and so forth can be allowed to remain on the other electronic device. A person may designate the other electronic device as theirs if it is located in their home, for example. Alternatively, a person may designate the other electronic device as theirs with an identification code that allows the user preferred settings, data, files, preferences, applications, application suites, and so forth to remain when the companion electronic device is ejected in one or more embodiments. Where the other electronic device is designated as belonging to the authorized user, in one or more embodiments this other electronic device can create a checkpoint or restore point of the user preferred settings, data, files, preferences, applications, application suites, and so forth stored in the companion electronic device such that this information can be recovered if the companion electronic device is lost or stolen.

In addition to the user preferred settings, data, files, preferences, applications, and application suites, other information can be stored in the encrypted memory of the companion electronic device as well. For instance, application preferences and context, such as bookmarks and open tabs in a browser, device settings such as preferred fonts, preferred font size, ringtone preferences, audio setting preferences, call handling preferences, data preferences, screen brightness preferences, and so forth can be stored in the encrypted memory as well. All of this information can be loaded onto another electronic device to configure the other electronic device when the companion electronic device is coupled to the other electronic device and the authentication device identifies authenticates authentication data as belonging to the authorized user of the companion electronic device.

In one or more embodiments, context determines which of this information is delivered to the other electronic device to configure the same. For example, in one or more embodiments the plurality of user preferred settings delivered to the other electronic device can be prioritized in accordance with context such as the time of day, the location, and so forth. Embodiments of the disclosure contemplate that a person may not want a work spreadsheet that they were working on at the office to open on their television when they get home from a long day of sorting numbers. Accordingly, in one or more embodiments the one or more processors of the companion electronic device may cause a video streaming application to open on the television, populated with a user-preferred viewing list as a function of the location of the device being at the user's home and the time being after the workday, for example. Other examples of context-based prioritization will be described below. Still others will be obvious to those of ordinary skill in the art having the benefit of this disclosure.

Turning now to FIG. 1, illustrated therein is one explanatory method 100 in accordance with one or more embodiments of the disclosure. Beginning at step 101, an electronic device 109, shown illustratively as a smartphone, is initially in an unconfigured and/or uncustomized state. While shown illustratively as a smartphone, it should be noted that the electronic device 109 could be any number of electronic devices, including a laptop computer, a tablet computer, a desktop computer, a gaming device, a voice assistant device, a smart television, an Internet-of-Things (IoT) device, or other type of electronic device. Other examples of electronic devices suitable for use with embodiments of the disclosure will be obvious to those of ordinary skill in the art having the benefit of this disclosure.

The electronic device 109 may be in the unconfigured and/or uncustomized state, for example, if it is a new device having been shipped from the factory with only generic functions and applications loaded and operable on the electronic device 109. Alternatively, the electronic device 109 may be a public device accessible to multiple users, such as a computer terminal in a library, school, or airport, which offers one or more generic functions or applications, such as a web browser application, to be used by guest users. The electronic device 109 may also be unconfigured and/or uncustomized if personal settings and preferences have been expunged from the electronic device 109 in accordance with embodiments described below.

When in the unconfigured and/or uncustomized state, generic functions such as telephone applications, text messaging applications, web browsing applications, and so forth may be fully operational. However, they are considered to be "unconfigured" or "uncustomized" due to the fact that user preferences, such as a particular person's preferred contact list of numbers for the telephone application, a particular person's history of exchanged text messages for the text messaging application, or a particular person's browsing history, bookmark, and open tabs for the web browsing application are not available or accessible by any of these applications. Thus, a guest user using a generic function may be able to navigate to a particular website, e.g., the home page of Buster's Bluesmen with their new album, Mac's Boogie Woogie. However, to do so they would need to either know the uniform resource locator (URL) of Buster's page, or else find it in a search engine due to the fact that no bookmarks are stored in the web browsing application in its generic state.

In one or more embodiments, the electronic device 109 includes a communication interface 114 with which it can communicate with a companion electronic device. In the illustrative embodiment of FIG. 1, the communication interface 114 comprises a physical interface in the form of a companion electronic device receiver slot with a physical connector 115 to which a companion electronic device can be coupled. The physical connector 115 can take a variety of forms. For example, the physical connector 115 can be any of a universal serial bus connector, secure digital card interface, high-definition multimedia connector, or other connector.

As will be described with reference to FIG. 3 below, in other embodiments the communication interface 114 can be configured as a wireless communication interface without a physical connector 115. For example, the communication interface 114 can be configured as any of a near-field communication interface, a Wi-Fi interface, a Bluetooth interface, or other wireless interface. Other forms of communication interfaces will be obvious to those of ordinary skill in the art having the benefit of this disclosure.

At step 102 a user 117 attaches 113 a companion electronic device 110 to the communication interface 114 of the electronic device 109. In this illustrative embodiment, the companion electronic device 110 is configured as a small, handheld device that the user 117 can conveniently carry in a pocket, on a lanyard around their neck, or attached to a bracelet. In one or more embodiments, the companion electronic device 110 includes a housing 111. In this illustrative embodiment, since the communication interface 114 of the electronic device 109 comprises a physical interface with a connector 115, the companion electronic device 110 includes a complementary connector 112, which is a universal serial bus connector in this example, and which serves as a communication interface for the companion electronic device 110. As shown at step 102, the user 117 attaches 113 the companion electronic device 110 to the electronic device 109 by sliding the housing 111 into the slot until the complementary connector 112 couples to the connector 115.

In one or more embodiments, the companion electronic device 110 includes an authentication device 116 that is carried by the housing 111 of the companion electronic device 110, and that is operable with one or more processors of the companion electronic device 110. In this illustrative embodiment, the authentication device 116 comprises a fingerprint sensor. However, as will be described below with reference to FIG. 4, the authentication device 116 can take other forms as well. For example, in another embodiment the authentication device 116 can comprise an imager that performs facial recognition on the user 117. In another embodiment, the authentication device 116 comprises an audio input device that performs voice recognition on audio input received from the user 117. In still another embodiment, the authentication device 116 comprises a depth scanner that obtains a depth scan of a face of the user 117. In still other embodiments, the authentication device 116 can comprise a touchpad allowing the user 117 to enter a signature or personal identification number (PIN). Regardless of type, in one or more embodiments the authentication device 116 is configured to process authentication data received by the authentication device 116 to determine whether the authentication data is received from, or belongs to, an authorized user of the companion electronic device 110. The various authentication devices listed above are illustrative only, and can be used alone or in combination. Other examples of authentication devices will be obvious to those of ordinary skill in the art having the benefit of this disclosure.

As will also be described below with reference to FIG. 4, in one or more embodiments the companion electronic device 110 comprises one or more processors and an encrypted memory operable with the one or more processors. In one or more embodiments, the one or more processors are operable with the authentication device 116 as well.

In one or more embodiments, the one or more processors of the companion electronic device 110 receive power from the electronic device 109 when the companion electronic device 110 is coupled to the electronic device 109. Said differently, in one or more embodiments the one or more processors of the companion electronic device 110 receive power from the communication interface 114 of the electronic device 109 when the communication interface of the companion electronic device 110, which is the complementary connector 112 in this example, establishes electronic communication with one or more processors of the electronic device 109. Accordingly, at step 103, the one or more processors of the companion electronic device 110 are actuated by power received from the complementary connector 112 upon the complementary connector 112 establishing communication with the electronic device 109. Thus, step 103 comprises the one or more processors of the companion electronic device 110 receiving power at the complementary connector 112 that actuates the one or more processors of the companion electronic device 110 in one or more embodiments.

At step 104, the user 117 is delivering authentication data 118 to the authentication device 116 of the companion electronic device 110. Since the authentication device 116 is a fingerprint sensor in this illustrative embodiment, the authentication data 118 comprises fingerprint data, with step 104 comprising the authentication device 116 receiving authentication data in the form of fingerprint data.

At decision 105, one or more processors of the companion electronic device 110 determine whether the authentication data 118 received from the user 117 at step 104 is received from an authorized user of the companion electronic device 110. The one or more processors of the companion electronic device 110 can compare the authentication data 118 with one or more predefined authentication references stored in the encrypted memory of the companion electronic device 110 to determine whether the authentication data sufficiently matches one or more of the predefined authentication references to confirm that the authentication data 118 belongs to, or is received from, an authorized user of the companion electronic device 110.

Where the one or more processors of the companion electronic device 110 fail to identify the authentication data 118 as belonging to, or being received from, an authorized user of the companion electronic device 110, in one or more embodiments step 106 comprises the one or more processors of the companion electronic device 110 causing only the generic functions of the electronic device 109 to be operable on the electronic device 109. Thus, a person could still interact with the electronic device 109, but would be treated as a guest user, and would be unable to use, access, or see any user preferred settings, data, files, preferences, applications, application suites, and so forth of the authorized user that may be stored in the encrypted memory of the companion electronic device 110. Thus, where the electronic device 109 includes one or more generic functions that are operable without access to any of the user preferred settings, data, files, preferences, applications, application suites, and so forth that may be stored in the encrypted memory of the companion electronic device 110, step 106 can comprise the one or more processors of the companion electronic device 110 causing only the one or more generic functions to be operable when the authentication data 118 received at step 104 fails to identify the user 117 as being an authorized user of the companion electronic device 110.

By contrast, when the one or more processors of the companion electronic device 110 confirm, at decision 105, that the authentication data 118 belongs to, or is received from, an authorized user of the companion electronic device 110, the method 100 moves to step 107 where the one or more processors of the companion electronic device 110 automatically deliver 119, from the encrypted memory, one or more user preferences 120 to the user interface, which is the complementary connector 112 in this example, and which is connected to the connector 115 of the electronic device 109, thereby enabling a communication connection between the companion electronic device 110 and the electronic device 109. In one or more embodiments, the one or more user preferences 120 enable one or more functions of the electronic device 109. For example, the one or more user preferences 120 can comprise an application suite defining a plurality of applications that should be downloaded and installed on the electronic device 109. Accordingly, delivering these one or more user preferences 120 to the electronic device 109 would cause the application suite to be downloaded and installed, thereby enabling these new applications as new functions of the electronic device 109 at step 107.

The one or more user preferences 120 can comprise a variety of data suitable for configuring the electronic device 109 to the personal tastes of an authorized user of the companion electronic device 110. Illustrating by example, the one or more user preferences 120 can comprise one or more user-preferred settings for one or more functions of the electronic device 109. This can include data and files belonging to the authorized user of the companion electronic device 110, other information belonging to the authorized user of the companion electronic device 110, and/or applications or an application suite preferred by the authorized user of the companion electronic device 110.

The one or more user preferences 120 can also comprise virtual private network communication preferences and credentials with which the electronic device 109 can communicate with other electronic devices across a network. The one or more user preferences 120 can include additional user preference information such as ringtone preferences, font size preferences, screen brightness preferences, audio setting preferences, call handling preferences, data handling preferences, application suite preferences, or other information. The one or more user preferences 120 can include a list of preferred electronic devices to which the electronic device 109 can connect, preferred power modes of operation for the electronic device 109, preferred authorized user authenticating technologies that should be used by the electronic device 109, e.g., voice recognition, fingerprint sensor, facial recognition, and so forth, preferred presence scanning duty cycles to detect whether a person is still using the electronic device 109 prior to the electronic device 109 entering a low-power or sleep monde, preferred methods of connection to cloud services for the electronic device 109, and so forth.

The one or more user preferences 120 can also include subscriber identification module information that can be loaded into an eSIM module of the electronic device 109, thereby allowing the electronic device 109 to transmit and receive voice calls, transmit and receive text messages, and otherwise use data from a subscription plan purchased by the authorized user of the companion electronic device 110. The one or more user preferences 120 cam also comprise credentials to access services in the "cloud." For example, the one or more user preferences 120 can comprise credentials to allow the electronic device 109 to access to accounts, application, data, and services stored on a remote server across a network in one or more embodiments. These examples of one or more user preferences 120 are illustrative only. Numerous others will be obvious to those of ordinary skill in the art having the benefit of this disclosure.

At step 108, the electronic device 109 has now been automatically transformed into a device that is configured and/or customized with the one or more user preferences 120. The electronic device 109 is now enabled with one or more functions, e.g., installed applications, new privacy settings, new communication connectivity channels, new user data presentation settings, new ringtones, new power operating mode settings, and so forth, that it did not have at step 101. In one or more embodiments, this configuration occurring at step 107 occurs automatically, and without any additional input from the user 117 beyond the delivery of the authentication data 118 at step 104. In this manner, the configuration and customization of the electronic device 109 by the companion electronic device 110 occurs seamlessly and instantly. To the user 117, "it just works."

The method 100 of FIG. 1 can be used in a variety of settings. Illustrating by example, if the electronic device 109 is a new device recently purchased from the manufacturer, using the method 100 of FIG. 1 the user 117 need only couple the companion electronic device 110 to the electronic device 109 at step 102 and deliver authentication data 118 at step 104 to quickly and conveniently configure and customize the electronic device 109 without the need of manually applying each and every customization by downloading applications, adjusting settings, and so forth. In another embodiment, the user 117 can quickly and conveniently customize a multi-user or public device as if it was their own using the companion electronic device 110 and the method 100 of FIG. 1. If in an airport, for example, a public smartphone could be quickly and conveniently personalized to perform just as if it was the personal smartphone of the user 117 using the method 100 of FIG. 1. Similarly, a smart television could be instantly and conveniently customized and configured during a hotel stay, as described above. Other beneficial and amazing uses for the method 100 of FIG. 1 will be obvious to those of ordinary skill in the art having the benefit of this disclosure.

Figure 2:
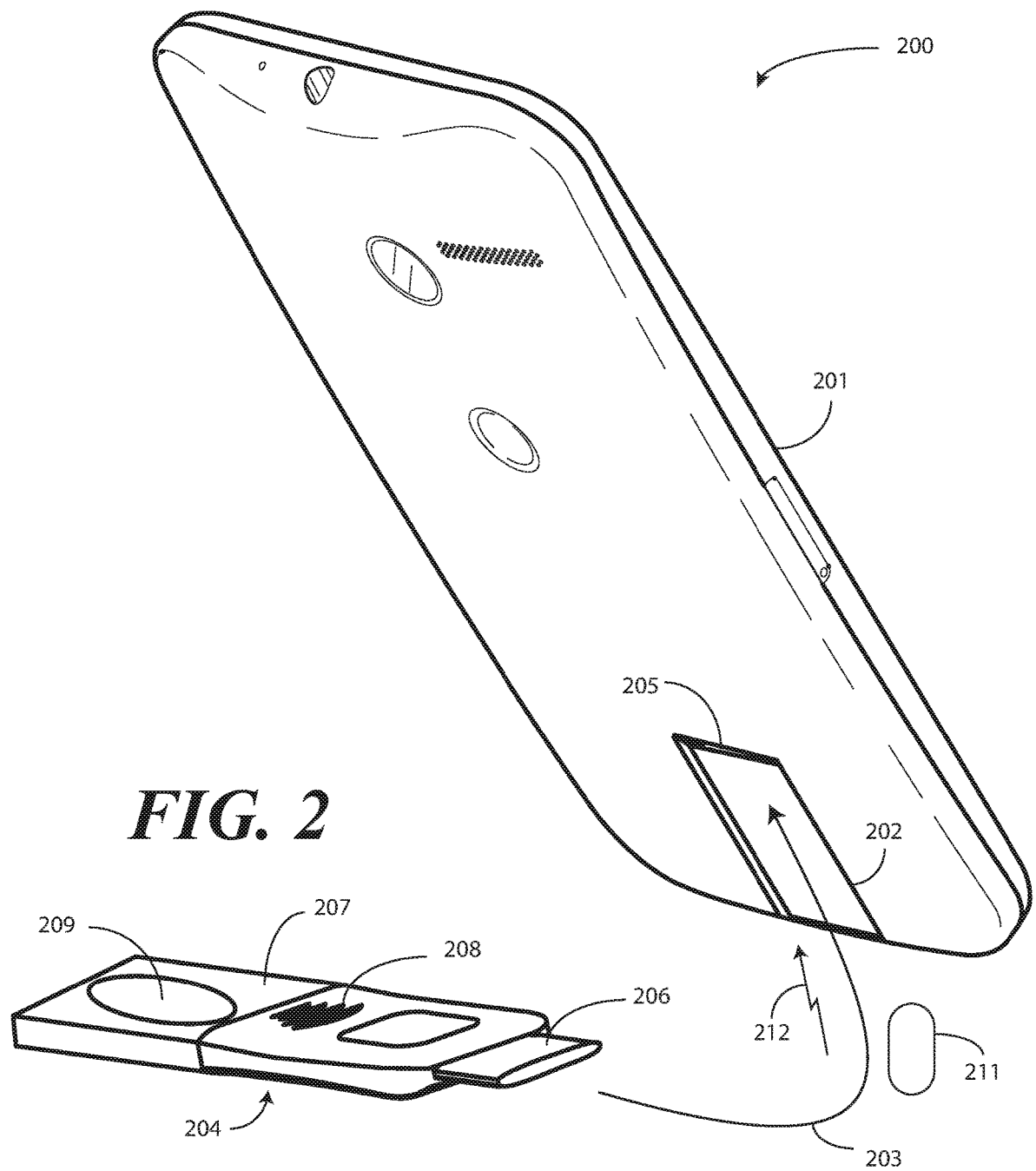
FIG. 2 illustrates one explanatory system in accordance with one or more embodiments of the disclosure.

Turning now to FIG. 2, illustrated therein is one explanatory system 200 configured in accordance with one or more embodiments of the disclosure. In this explanatory embodiment, the system 200 comprises an electronic device 201 and a companion electronic device 204.

As with the embodiment of FIG. 1, in the system 200 of FIG. 2, the electronic device 201 is configured as a smartphone for illustration purposes. However, as noted above the electronic device 201 could be configured as any number of electronic devices operable with one or more user preferences, settings, applications, application suites, data, or files. The electronic device 201 could be a laptop computer, a tablet computer, a desktop computer, a gaming device, a voice assistant device, a smart television, IoT device, or other type of electronic device.

In one or more embodiments, the electronic device 201 includes a companion electronic device receiving slot 202 which can mechanically receive, and electrically couple to, a companion electronic device 204. The companion electronic device receiving slot 202 includes a connector 205 with which the electronic device 201 can communicate by sending and receiving electrical signals to a corresponding connector 206 of the companion electronic device 204. In this illustrative embodiment, both the connector 205 and the corresponding connector 206 of the companion electronic device 204 comprise universal serial bus connectors. As noted above, other types of connectors, including secure digital card connectors, can be substituted for the universal serial bus connectors of FIG. 2.

The companion electronic device 204 of this embodiment is configured as a fob. The fob defines a small, hand-holdable electronic device that a person can conveniently carry in a pocket, on a lanyard around their neck, or attached to a bracelet or other linkage. The companion electronic device 204 of this embodiment includes a housing 207 that includes one or more finger grips 208 with which a person can grasp the housing 207 to insert and couple the housing 207 and connector 206 of the companion electronic device 204 to, or retract and decouple the housing 207 and connector 206 of the companion electronic device 204 from, the companion electronic device receiving slot 202 of the electronic device 201.

In one or more embodiments, the coupling of the connector 205 of the electronic device 201 and the corresponding connector 206 of the companion electronic device 204 establishes a communication interface between the electronic device 201 and the companion electronic device 204 such that electrical signals can be sent and received between the electronic device 201 and the companion electronic device 204 to establish an electronic signal communication connection between the two devices.

In some embodiments, the companion electronic device 204 can include its own energy storage source for powering the internal components of the companion electronic device 204, which can include one or more processors, an encrypted memory, and other components. However, in other embodiments, these components are powered by power received from the communication interface created by the coupling of the connector 205 of the electronic device 201 and the corresponding connector 206 of the companion electronic device 204. Accordingly, in one or more embodiments the coupling of the connector 205 of the electronic device 201 and the corresponding connector 206 of the companion electronic device 204 causes power to be delivered from the electronic device 201 across the communication interface to the companion electronic device 204. In one or more embodiments, this power, received from the communication interface defined by the coupling of the connector 205 of the electronic device 201 and the corresponding connector 206 of the companion electronic device 204, actuates the one or more processors and various other components of the companion electronic device 204.

As with the embodiment of FIG. 1, in this embodiment the companion electronic device 204 also includes an authentication device carried by the housing 207 of the companion electronic device 204. In this example, the authentication device comprises a fingerprint sensor 209 situated along a major surface of the housing 207 of the companion electronic device 204. In one or more embodiments the fingerprint sensor 209 is configured to process fingerprint data received by the fingerprint sensor 209 to determine whether the fingerprint data is belongs to, or is received from, an authorized user of the companion electronic device 204.

In one or more embodiments, one or more processors of the companion electronic device 204 deliver signals 203 to the communication interface defined by the coupling of the connector 205 of the electronic device 201 and the corresponding connector 206 of the companion electronic device 204 upon confirming that the fingerprint data received by the fingerprint sensor 209 belongs to an authorized user of the companion electronic device 204. In one or more embodiments, these signals 203 enable one or more functions of the electronic device 201 in that they provide one or more user preferred settings 211 for the one or more functions of the electronic device 201 to be operational in a customized or configured mode of operation, and which were not operational when the electronic device 201 was configured only in a generic mode. In one or more embodiments, the one or more processors of the companion electronic device 204 automatically deliver these one or more user preferred settings 211 to the communication interface defined by the coupling of the connector 205 of the electronic device 201 and the corresponding connector 206 of the companion electronic device 204 upon the one or more processors of the companion electronic device 204 confirming that the fingerprint data received by the fingerprint sensor 209 belongs to an authorized user of the companion electronic device 204.

As previously described, these one or more user preferred settings 211 can comprise one or more of a ringtone preference for the electronic device 201, a font size preference for a display of the electronic device 201, an audio setting preference for an audio output of the electronic device, a call handling preference for a telephone application of the electronic device 201, a screen brightness preference for the display of the electronic device 201, or an application suite preference defining a plurality of applications that should be installed and operational on the electronic device 201, as well as optionally including a predefined arrangement with which the application suite appears on a user interface of the electronic device 201. The signals 203 delivering these user preferred settings 211 can enable one or more functions of the electronic device 201 which were not operational when the electronic device 201 was configured only in a generic mode to be operational in a customized or configured mode of operation. For example, if one of the user preferred settings 211 is a ringtone preference, the signals 203 may cause the processors of the electronic device 201 to download a purchased ring tone belonging to the authorized user and install it on the electronic device 201, thereby giving it a new, customized ringtone feature that was not available when only generic ringtones were available for use, and so forth.

In one or more embodiments, the one or more processors of the companion electronic device 204 can also deliver one or more actuation signals 212 to the communication interface defined by the coupling of the connector 205 of the electronic device 201 and the corresponding connector 206 of the companion electronic device 204 that actuate at least one function of the one or more functions of the electronic device 201 enabled by the delivery of the user preferred settings 211. In one or more embodiments, the one or more processors of the companion electronic device 204 deliver these actuation signals 212 to the communication interface after delivering the one or more user preferred settings 211 to the communication interface.

Illustrating by example, where the user preferred settings 211 include a spreadsheet stored within the encrypted memory of the companion electronic device 204 that the authorized user was working on earlier in the day, in one or more embodiments after delivering the spreadsheet to the electronic device 201, the one or more processors of the companion electronic device 204 may deliver the actuation signals 212 to the electronic device 201 causing the processors of the electronic device 201 to launch a spreadsheet application opening the spreadsheet, and so forth.

In one or more embodiments, one or more of the signals 203, the user preferred settings 211, and/or the actuation signals 212 are transmitted as a function of an operating context of the electronic device 201. Illustrating by example, in one or more embodiments the actuation signals 212 delivered from the connector 206 of the companion electronic device 204 to the connector 205 of the electronic device 201 cause actuation of one or more predefined applications on the electronic device 201, with that actuation occurring as a function of the operating context of the electronic device 201.

Illustrating by example, if the operating context of the electronic device 201 is that it is operating in the cellar of the authorized user, in the evening, at the end of the work day, in one or more embodiments the one or more processors of the companion electronic device 204 deliver actuation signals 212 that may cause a wine label searching application to launch on the display of the electronic device 201, as it is likely that the authorized user is searching for an aged bottle of Montrachet to enjoy with their kale and white beans. In such an operating context, the authorized user would have little use for the spreadsheet from work mentioned in the preceeding paragraph, as the workday is done. After returning to the kitchen with a grand cru bottle, the one or more processors of the companion electronic device 204 may detect this change in context and automatically deliver other actuation signals 212 to the electronic device 201 that launch a music player application so that the authorized user can enjoy some west coast jazz with their expensive chardonnay. However, when the authorized user removes the companion electronic device 204 from the electronic device 201 and takes it to work the next day and attaches it to their tablet computer, the one or more processors of the companion electronic device 204 may deliver actuation signals 212 causing the dreary old spreadsheet to again be presented on the display of that tablet computer. Alas.

Thus, as shown and described with reference to FIG. 2, in one or more embodiments a system 200 includes an electronic device 201 and a companion electronic device 204, which is electrically, and in this case physically, connectable to the electronic device 201. The companion electronic device 204 includes a fingerprint sensor 209, an encrypted memory storing a plurality of user preferences 211, which can include a plurality of user preferred settings for the electronic device 201, and one or more processors operable with the fingerprint sensor 209 and the encrypted memory. As described, in one or more embodiments the one or more processors configure the electronic device 201 with the plurality of user preferred settings when the companion electronic device 204 is coupled to the electronic device 201 and fingerprint data received by the fingerprint sensor 209 is identified as belonging to an authorized user of the companion electronic device 204. Turning now to FIGS. 3 and 4, additional details of the electronic device 201 and the companion electronic device 204 will be explored.

Figure 3:
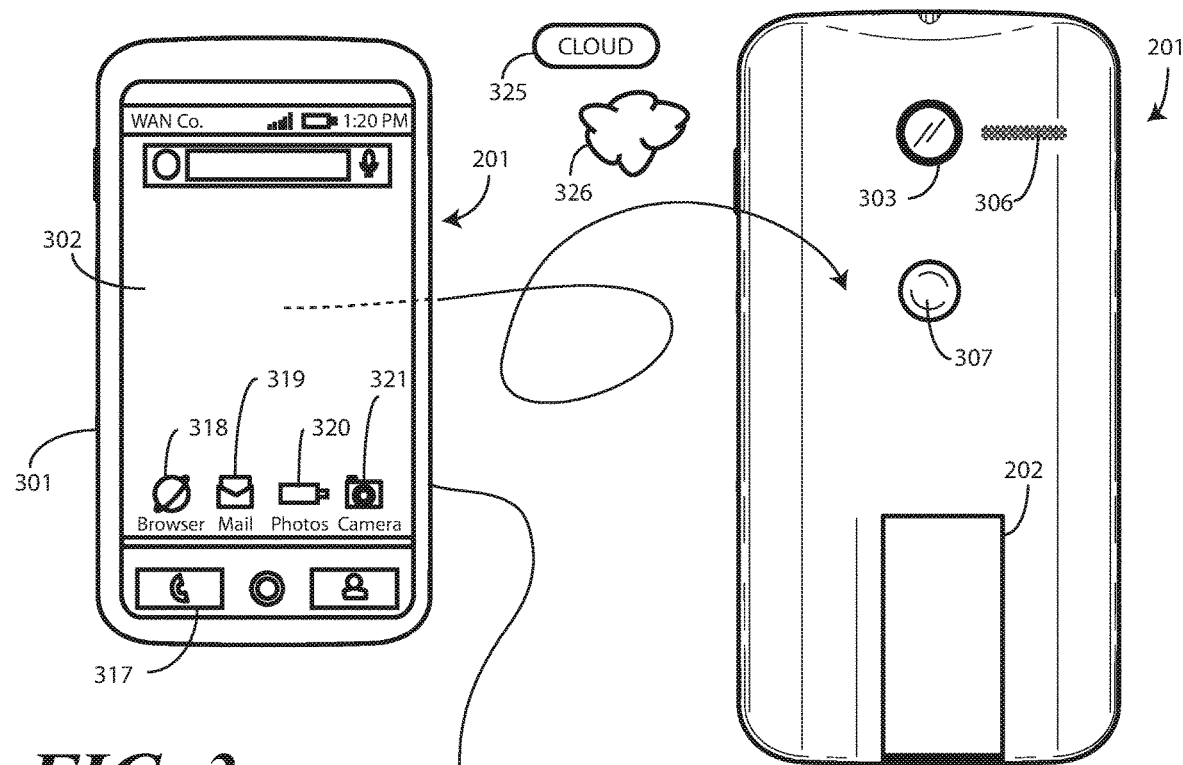
FIG. 3 illustrates one explanatory electronic device in accordance with one or more embodiments of the disclosure.
Figure 3:
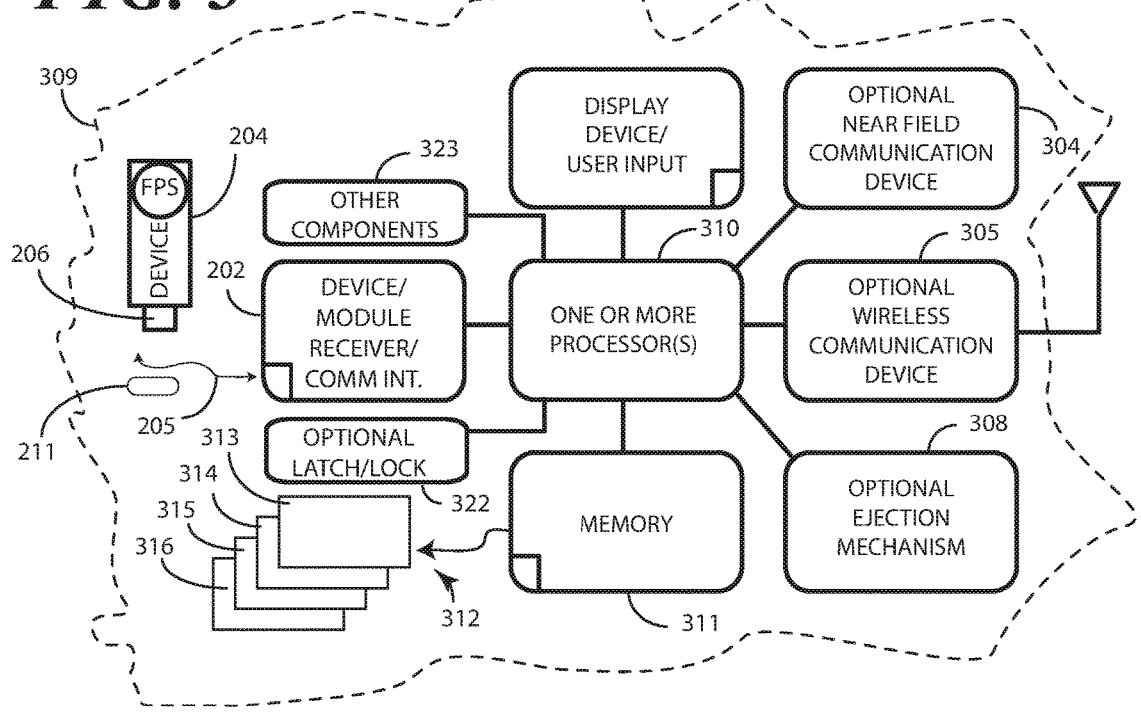

Beginning with FIG. 3, illustrated therein is the electronic device 201 of FIG. 2. The electronic device 201 of this illustrative embodiment includes a display 302, which may optionally be touch-sensitive. The display 302 can serve as a primary user interface of the electronic device 201. Where, touch sensitive, users can deliver user input to the display 302 of such an embodiment by delivering touch input from a finger, stylus, or other objects disposed proximately with the display. In one embodiment, the display 302 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 201 of FIG. 3 includes a housing 301. Features can be incorporated into the housing 301. Examples of such features include the companion electronic device receiving slot 202, which can mechanically receive, and electrically couple to, a companion electronic device 204. As described above, the companion electronic device receiving slot 202 can optionally include a connector (205) with which the electronic device 201 can communicate by sending and receiving electrical signals to a corresponding connector 206 of the companion electronic device 204 in one or more embodiments. In other embodiments, the communication between the electronic device 201 and the companion electronic device 204 will occur via wireless communication, such as via an optional near field communication circuit 304 or via a wireless communication channel established between the companion electronic device 204 and a communication circuit 305.

Other examples of features that can be included along the housing 301 include an imager, shown as camera 303, or an optional speaker port 306. In this illustrative embodiment, a user interface component 307, which may be a button or touch sensitive surface, can also be disposed along the housing 301. The user interface component 307 may be used to actuate an optional ejection mechanism 308 configured to decouple and detach the companion electronic device 204 from the electronic device 201.

A block diagram schematic 309 of the electronic device 201 is also shown in FIG. 3. In one embodiment, the electronic device 201 includes one or more processors 310. In one embodiment, the one or more processors 310 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components of the electronic device 201. Each of the application processor and the auxiliary processor(s) can be configured to process and execute executable software code to perform the various functions of the electronic device 201. A storage device, such as memory 311, can optionally store the executable software code used by the one or more processors 310 during operation.

In this illustrative embodiment, the electronic device 201 also includes a communication circuit 305 that can be configured for wired or wireless communication with one or more other devices or networks. The networks can include a wide area network, a local area network, and/or personal area network. The communication circuit 305 may also utilize wireless technology for communication, such as, but are not limited to, peer-to-peer, or ad hoc communications such as HomeRF, Bluetooth and IEEE 802.11 based communication, or alternatively via other forms of wireless communication such as infrared technology. The communication circuit 305 can include wireless communication circuitry, one of a receiver, a transmitter, or transceiver, and one or more antennas.

The electronic device 201 can optionally include a near field communication circuit 304 used to exchange data, power, and electrical signals between the electronic device 201 and the companion electronic device 204. In one embodiment, the near field communication circuit 304 is operable with a wireless near field communication transceiver, which in one embodiment is a form of radio-frequency device configured to send and receive radio-frequency data to and from the companion electronic device 204 or other near field communication objects. The near field communication circuit 304 can have its own near field communication circuit controller in one or more embodiments to wirelessly communicate with the companion electronic device 204 using various near field communication technologies and protocols. The near field communication circuit 304 can include—as an antenna—a communication coil that is configured for near-field communication at a particular communication frequency. The term "near-field" as used herein refers generally to a distance of less than about a meter or so. The communication coil communicates by way of a magnetic field emanating from the communication coil when a current is applied to the coil. A communication oscillator applies a current waveform to the coil. The near field communication circuit controller may further modulate the resulting current to transmit and receive data, power, or other communication signals with the companion electronic device 204.

In one embodiment, the one or more processors 310 can be responsible for performing the primary functions of the electronic device 201. For example, in one embodiment the one or more processors 310 comprise one or more circuits operable to present presentation information, such as images, text, and video, on the display 302. The executable software code used by the one or more processors 310 can be configured as one or more modules 312 that are operable with the one or more processors 310. Such modules 312 can store instructions, control algorithms, and so forth.

In one embodiment, the one or more processors 310 are responsible for running the operating system environment 313. The operating system environment 313 can include a kernel, one or more drivers, and an application service layer 314, and an application layer 315. The operating system environment 313 can be configured as executable code operating on one or more processors or control circuits of the electronic device 201.

The application layer 315 can be responsible for executing application service modules. The application service modules may support one or more applications 316 or "apps." Examples of such applications shown in FIG. 3 include a cellular telephone application 317 for making voice telephone calls, a web browsing application 318 configured to allow the user to view webpages on the display 302 of the electronic device 201, an electronic mail application 319 configured to send and receive electronic mail, a photo application 320 configured to organize, manage, and present photographs on the display 302 of the electronic device 201, and a camera application 321 for capturing images. Collectively, these applications constitute an "application suite."

In one or more embodiments, these applications are operable either in a generic mode or a customized mode. For example, populating the photo application 320 with the photographs of an authorized user enables a new function in the electronic device 201 by allowing the one or more processors 310 of the electronic device 201 to present information that was not presentable when the photo application 320 was operating in a generic mode. In the generic mode, the photo application may only be able to present photographs captured by the camera application 321 captured when the camera application 321 is operating in the generic mode, for example.

Accordingly, when the companion electronic device 204 delivers signals 203 including a plurality of user preferences 211, and that plurality of user preferences 211 either includes the photographs belonging to an authorized user of the companion electronic device 204, or alternatively provide one or more authorization credentials causing a login event connecting the communication circuit 305 of the electronic device 201 to one or more cloud-based services 325 across a network 326 from which the photographs can be retrieved, these signals 203 enable a function of the electronic device 201, which in this example is the ability to present photographs belonging to the authorized user of the companion electronic device 204.

Similarly, the signals 203 can enable another function by altering the application suite operating on the electronic device 201. In the example of FIG. 3, only five applications are shown operating on the electronic device 201 when the electronic device 201 is operating in the generic mode. Four are arranged in a line on the display 302, left to right, with the web browsing application 318 followed by the electronic mail application 319. The photo application 320 is then followed by the camera application 321.

In one or more embodiments, when the companion electronic device 204 delivers signals 203 including a plurality of user preferences 211, and that plurality of user preferences 211 includes additional applications not stored on the electronic device 201 when operating in the generic mode, these signals 203 enable a function of the electronic device 201, which in this example is the ability to operate a new application on the electronic device 201 that is not downloaded and operable with the electronic device 201 is operating in the generic mode. Other examples of how the plurality of user preferences 211 will enable functions of the electronic device 201 will be described below with reference to FIG. 4. Still others will be obvious to those of ordinary skill in the art having the benefit of this disclosure.

In one or more embodiments, the one or more processors 310 are responsible for managing the applications and all secure information received from the companion electronic device 204 when operating on the electronic device 201. The one or more processors 310 can also be responsible for launching, monitoring and killing the various applications and the various application service modules. In one or more embodiments, as will be described in more detail below with reference to FIG. 6, in one or more embodiments the one or more processors 310 are operable to not only kill the applications customized by the plurality of user preferences 211 when the companion electronic device 204 is decoupled from the electronic device 201, but also to expunge any and all preferences, data, files, settings, or other configuration tools received form the companion electronic device 204 from the memory 311 to wipe the memory 311 clean of any personal data, preferences, or settings of the authorized user of the companion electronic device 204.

The electronic device 201 can include an optional locking mechanism 322 that is operable to retain the companion electronic device 204 in a connected and coupled configuration attached to the electronic device 201. The optional locking mechanism 322 can be a simple mechanical latch, such as a push-push locking mechanism in one embodiment. In other embodiments, the frictional connection between the connector 206 of the companion electronic device 204 and the connector 205 of the electronic device 201 will sufficiently retain the companion electronic device 204 in a connected and coupled configuration where the companion electronic device 204 is attached to the electronic device 201.

In still other embodiments, the one or more processors 310 may generate commands to electronically control the optional locking mechanism 322 to either release the companion electronic device 204 from the companion electronic device receiving slot 202, or alternatively to physically retain the companion electronic device 204 within the companion electronic device receiving slot 202, as a function of user input received at the display 302, the user interface component 307, or at another user interface device.

The one or more processors 310 can also be operable with other components 323. The other components 323, in one embodiment, include an acoustic detector, such as a microphone. The one or more processors 310 may process information from the other components 323 alone or in combination with other data, such as the information stored in the memory 311 or information received from the user interface.

The other components 323 can include a video input component such as an optical sensor, another audio input component such as a second microphone, and a mechanical input component such as button or key selection sensors, touch pad sensor, capacitive sensor, motion sensor, and switch. Similarly, the other components 323 can include video, audio, and/or mechanical outputs.

The other components 323 may include, but are not limited to, accelerometers, touch sensors, surface/housing capacitive sensors, audio sensors, and video sensors. Touch sensors may used to indicate whether the electronic device 201 is being touched at side edges. The other components 323 of the electronic device can also include a device interface to provide a direct connection to auxiliary components or accessories for additional or enhanced functionality and a power source, such as a portable battery, for providing power to the other internal components and allow portability of the electronic device 201.

It is to be understood that FIG. 3 is provided for illustrative purposes only and for illustrating components of one electronic device 201 in accordance with embodiments of the disclosure, and is not intended to be a complete schematic diagram of the various components required for an electronic device. Therefore, other electronic devices in accordance with embodiments of the disclosure may include various other components not shown in FIG. 3, or may include a combination of two or more components or a division of a particular component into two or more separate components, and still be within the scope of the present disclosure.

Figure 4:
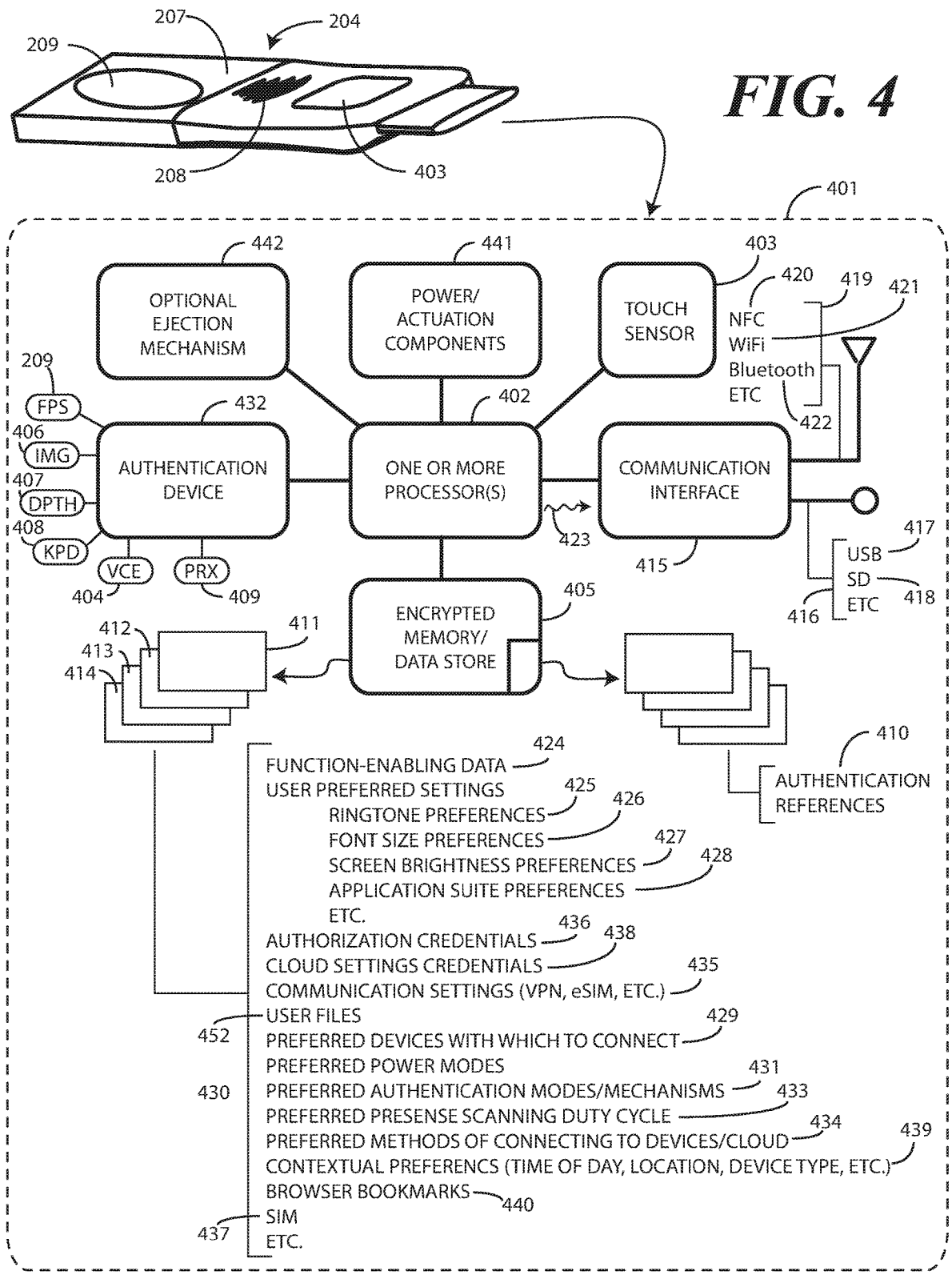
FIG. 4 illustrates another explanatory electronic device in accordance with one or more embodiments of the disclosure.

Turning now to FIG. 4, illustrated therein is a block diagram schematic 401 of one explanatory companion electronic device 204. It should be noted that the block diagram schematic 401 of FIG. 4 is provided for illustrative purposes only and for illustrating components of one companion electronic device 204 in accordance with embodiments of the disclosure. The block diagram schematic of FIG. 4 is not intended to be a complete schematic diagram of the various components required for a companion electronic device 204.

Therefore, other companion electronic devices configured in accordance with embodiments of the disclosure may include various other components not shown in FIG. 4, or may include a combination of two or more components or a division of a particular component into two or more separate components, and still be within the scope of the present disclosure. A companion electronic device may have fewer, or different, components from another companion electronic device configured in accordance with embodiments of the disclosure. Accordingly, companion electronic devices configured in accordance with embodiments of the disclosure can include some components that are not shown in FIG. 4, and other components that are shown may not be needed and can therefore be omitted.

The companion electronic device 204 comprises a housing 207. Features can be incorporated into the housing 207. In this illustrative embodiment, an authentication device 432 is disposed along a surface of the housing 207. In one embodiment, the authentication device 432 is responsible for authentication data received at the authentication device 432 to authenticate or otherwise identify a user as an authorized user of the companion electronic device 204. Other devices can be disposed along the housing 207 as well. Examples of such devices include ribs or finger grips 208 for gripping the companion electronic device 204 or an optional touch sensor 403 for detecting a person touching the housing 207 of the companion electronic device 204.

In one embodiment, the authentication device 432 comprises a biometric sensor. In one or more embodiments, the biometric sensor comprises a fingerprint sensor 209, as previously described. However, other types of biometric sensors that can be substituted for the fingerprint sensor 209 will be obvious to those of ordinary skill in the art having the benefit of this disclosure. For example, in other embodiments the biometric sensor can be a voice interface engine 404 of an audio input/processor.

The voice interface engine 404 can include hardware, executable code, and speech monitor executable code in one embodiment. The voice interface engine 404 can include, stored in the encrypted memory 405, basic speech models, trained speech models, or other modules that are used by the voice interface engine 404 to receive and identify a particular user's voice commands that are received with audio input captured by an audio input device, such as one or more microphones situated along the housing 207 of the companion electronic device 204. In one embodiment, the voice interface engine 404 performs voice recognition operations.

In another embodiment, the authentication device 432 can be an imager processor system. The imager processor system can be operable with sensors of the companion electronic device 204, such as a camera or imager 406, to identify the user through facial recognition techniques by capturing photographs of the user.

Where the authentication device 432 is configured as an imager processor system, the authentication device 432 can include one or more processors that are operable with one or more sensors. For example, in one or more embodiments the one or more sensors operable with the imager processor system \comprise one or more of the aforementioned imager 406, a depth imager 407, and, optionally, one or more proximity sensors 409.

In one embodiment, the imager 406 comprises a two-dimensional imager configured to receive at least one image of an environment about the companion electronic device 204. In one embodiment, the imager 406 comprises a two-dimensional Red-Green-Blue (RGB) imager. In another embodiment, the imager 406 comprises an infrared imager. Other types of imagers suitable for use as the imager 406 of companion electronic device 204 will be obvious to those of ordinary skill in the art having the benefit of this disclosure.

The one or more proximity sensors 409, where included, can take various forms. In one or more embodiments, the one or more proximity sensors 409 fall in to one of two camps: active proximity sensors and "passive" proximity sensors. Either the proximity detector components or the proximity sensor components can be generally used for detecting persons and/or present within the environment, distances between warm objects and the companion electronic device 204, changes in distance between warm objects and the companion electronic device, and other information.

As used herein, a "proximity sensor component" comprises a signal receiver only that does not include a corresponding transmitter to emit signals for reflection off an object to the signal receiver. A signal receiver only can be used due to the fact that a user's body or other heat generating object external to the companion electronic device 204 serves as the transmitter. In one embodiment, the signal receiver is an infrared signal receiver to receive an infrared emission from a source, such as a human being, when the human being is approaching the companion electronic device 204.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one embodiment, the one or more proximity sensors 409 simply comprise a proximity sensor component. In another embodiment, the one or more proximity sensors 409 comprise a simple thermopile. In another embodiment, the one or more proximity sensors 409 comprise an infrared imager that captures the amount of thermal energy emitted by an object. In still other embodiments, the one or more proximity sensors 409 comprise a proximity detector component. Of course, combinations of these components can be used as the one or more proximity sensors 409. Moreover, other types of proximity sensors suitable for use with the companion electronic device 204 will be obvious to those of ordinary skill in the art having the benefit of this disclosure.

As with the one or more proximity sensors 409, the depth imager 407, where included, can take a variety of forms. In a first embodiment, the depth imager 407 comprises a pair of imagers separated by a predetermined distance, such as three to four images. This "stereo" imager works in the same way the human eyes do in that it captures images from two different angles and reconciles the two to determine distance.

In another embodiment, the depth imager 407 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 407 comprises a time of flight device. Time of flight three-dimensional sensors emit laser or infrared pulses and received reflections/image to a photodiode array. These pulses reflect back from a surface, such as the user's face. The time it takes for pulses to move from the photodiode array to the surface and back determines distance, from which a three-dimensional mapping of a surface can be obtained.

In one or more embodiments where the authentication device 432 is configured as an imager processor system, it can function as one or both of a face analyzer and/or an environmental analyzer. Where so configured, the authentication device 432 can be configured to process an image or depth scan of an object and determine whether the object matches predetermined criteria by comparing the image or depth scan to one or more predefined authentication references 410 stored in the encrypted memory 405.

In one or more embodiments, the authentication device 432 can determine whether a person is an authorized user of the companion electronic device 204. In one or more embodiments, the authentication device 432 can employ optical and/or spatial recognition to identify persons or objects using image recognition, character recognition, visible recognition, facial recognition, color recognition, shape recognition, and the like. Advantageously, in one or more embodiments the authentication device 432 can be used as a facial recognition device and/or companion electronic device recognition device in one or more embodiments.

In one or more embodiments, one or both of the imager 406 and/or the depth imager 407 can capture a photograph and/or depth scan of a person. The authentication device 432 can then compare the image and/or depth scan to one or more predefined authentication references 410 stored in the encrypted memory 405. With respect to a person, this comparison, in one or more embodiments, is used to confirm beyond a threshold authenticity probability that the person's face—both in the image and the depth scan—sufficiently matches one or more of the predefined authentication references 410 stored in the encrypted memory 405 for the authentication device 432 to identify the person as being an authorized user of the companion electronic device 204.

In another embodiment, the authentication device 432 can be something other than a biometric sensor. For example, in another embodiment the authentication device 432 can be a user interface device 408, such as a keypad or touch screen, with which a user can enter authentication data. For example, in one embodiment the authentication device 432 comprises a user interface device allowing a person to enter a password or personal identification number (PIN) to authenticate themselves as the authorized user of the companion electronic device 204. Other examples of authentication devices suitable for use in the companion electronic device 204 will be obvious to those of ordinary skill in the art having the benefit of this disclosure.

Where the authentication device 432 is configured as a fingerprint sensor 209, in one or more embodiments it includes its own processor to perform various functions, including detecting a finger touching the fingerprint sensor 209, capturing and storing fingerprint data from the finger, and optionally identifying or authenticating a user based upon the fingerprint data. In one or more embodiments the processor of the fingerprint sensor 209 can, as one pre-processing step, perform a preliminary authentication of the user by comparing fingerprint data captured by the fingerprint sensor 209 to a reference file stored in the encrypted memory 405, while secondary authentication is performed by the one or more processors 402. The processor of the fingerprint sensor 209 can be an on-board processor. Alternatively, the processor can be a secondary processor that is external to, but operable with, the fingerprint sensor in another embodiment. Other configurations will be obvious to those of ordinary skill in the art having the benefit of this disclosure.

In one embodiment, the fingerprint sensor 209 can include a plurality of sensors. The fingerprint sensor 209 can be a complementary metal-oxide-semiconductor active pixel sensor digital imager or any other fingerprint sensor. The fingerprint sensor 209 can be configured to capture, with the plurality of sensors, a live scan of a fingerprint pattern from a finger disposed along its surface, and to store this information as fingerprint data from the user's finger. The fingerprint sensor 209 may also be able to capture one or more images with the plurality of sensors. The images can correspond to an area beneath a surface of skin. The fingerprint sensor 209 can compare the fingerprint data or skin images to one or more references to authenticate a user in an authentication process. While the fingerprint sensor 209 is disposed along a top surface of the housing 207 in this illustration, it should be noted that it could alternatively be disposed along the bottom surface of the housing 207 or on the sides of the housing in other embodiments.

The companion electronic device 204 includes one or more processors 402. The one or more processors 402 can be operable with the various components of the companion electronic device 204. The one or more processors 402 can be configured to process and execute executable software code to perform the various functions of the companion electronic device 204. A storage device, such as the encrypted memory 405, can optionally store the executable software code used by the one or more processors 402 during operation.

In one or more embodiments, the encrypted memory 405 can store one or more user preferred settings 411, one or more user preferences 412, one or more user preferred configurations 413, and/or user data 414 belonging to an authorized user of the companion electronic device 204. In one or more embodiments, the one or more processors 402 are configured to automatically deliver, from the encrypted memory 405 upon the authentication device 432 confirming that received authentication data was received from an authorized user of the companion electronic device 204, the one or more user preferred settings 411, one or more user preferences 412, one or more user preferred configurations 413, and/or user data 414 to the communication interface 415 of the companion electronic device 204. In one or more embodiments, one or more of the one or more user preferred settings 411, one or more user preferences 412, one or more user preferred configurations 413, and/or user data 414 enable one or more functions of the electronic device receiving the one or more user preferred settings 411, one or more user preferences 412, one or more user preferred configurations 413, and/or user data 414 so long as power is being delivered to the one or more processors 402 of the companion electronic device 204 through the communication interface 415.

The communication interface 415 can take a variety of forms. Illustrating by example, in one or more embodiments the communication interface 415 is a physical interface 416. In one or more embodiments, the physical interface 416 comprises a universal serial bus connector 417. In other embodiments, the physical interface 416 comprises a secure digital (SD) card interface 418. Other examples of physical interfaces for the communication interface 415 will be obvious to those of ordinary skill in the art having the benefit of this disclosure. For example, the physical interface 416 can comprise a high-definition multimedia connector or other connector which the companion electronic device can be coupled to another electronic device.

In other embodiments, the communication interface 415 comprises a wireless interface 419. In one or more embodiments, the wireless interface 419 comprises a near-field communication interface 420. In another embodiment, the wireless interface 419 comprises a wireless fidelity interface 421. In still other embodiments, the communication interface 415 comprises a Bluetooth interface 422. Other examples of wireless interfaces will be obvious to those of ordinary skill in the art having the benefit of this disclosure. For example, in another embodiment the wireless interface 419 comprises an ad hoc or peer-to-peer interface.

In one or more embodiments, the communication interface 415 delivers the one or more user preferred settings 411, one or more user preferences 412, one or more user preferred configurations 413, and/or user data 414 to an electronic device to which the companion electronic device 204 is coupled. In one or more embodiments, the communication interface 415 also receives power from the electronic device to which the companion electronic device 204 is coupled. In one or more embodiments, this power received from the other electronic device through the communication interface 415 is used to actuate and power the one or more processors 402 of the companion electronic device 204, as well as the other components operable with the one or more processors 402. Power conversion/storage circuitry 441 can be included to buffer and/or process the received power used by the one or more processors 402 of the companion electronic device 204.

In one or more embodiments, the one or more processors 402 automatically deliver, from the encrypted memory 405, and after confirming that authentication data received by the authentication device 432 is received from an authorized user of the companion electronic device 204, the one or more user preferred settings 411, one or more user preferences 412, one or more user preferred configurations 413, and/or user data 414. In one or more embodiments, this occurs only while power received from the communication interface 415 is actuating and/or powering the one or more processors 402. Where the authentication device 432 is configured as the fingerprint sensor 209, the one or more processors 402 can deliver signals 423 to the communication interface 415 that enable one or more functions of the electronic device to which the companion electronic device 204 is coupled upon confirming that fingerprint data received by the fingerprint sensor 209 belongs to an authorized user of the companion electronic device 204. In one or more embodiments, the one or more processors 402 deliver the one or more user preferred settings 411, one or more user preferences 412, one or more user preferred configurations 413, and/or user data 414 to configure the electronic device to which the companion electronic device 204 is coupled when the companion electronic device 204 is coupled to that electronic device and the fingerprint sensor 209 identifies received fingerprint data as belonging to the authorized user of the companion electronic device 204.

The one or more user preferred settings 411, one or more user preferences 412, one or more user preferred configurations 413, and/or user data 414 can take a variety of forms. For example, the one or more user preferred settings 411, one or more user preferences 412, one or more user preferred configurations 413, and/or user data 414 can include data, information, and preferences that the electronic device to which the companion electronic device 204 is coupled can load, process, execute, present, or transmit. Additionally, the one or more user preferred settings 411, one or more user preferences 412, one or more user preferred configurations 413, and/or user data 414 can comprise files 452, preferences, and applications preferred by the user. For example, the one or more user preferred settings 411 can include one or more user files, which can be automatically delivered to another electronic device upon the one or more processors 402 of the companion electronic device 204 confirming that fingerprint data received by the fingerprint sensor 209 belongs to an authorized user of the companion electronic device 204.

Examples include function-enabling data 424. For example, if the electronic device to which the companion electronic device 204 is coupled includes facial recognition capabilities, the function-enabling data 424 may include one or more predefined authentication references to which the facial recognition hardware can compare captured images or facial depth scans to identify the authorized user of the companion electronic device 204 as the authorized user of the electronic device to which the companion electronic device 204 is coupled. Accordingly, delivery of this function-enabling data 424 would enable the facial recognition function to be performed using the facial recognition hardware in one or more embodiments.

The one or more user preferred configurations 413 can comprise various settings. These settings can include such as ringtone preferences 425, font size preferences 426, screen brightness preferences 427, audio setting preferences, call handling preferences, data handling preferences, application suite preferences 428, or other information. For example, the one or more user preferred configurations 413 can be delivered to another electronic device in the form of signals that cause a predefined application suite to be loaded on the other electronic device. The one or more user preferred settings 411, one or more user preferences 412, one or more user preferred configurations 413, and/or user data 414 can also include preferred electronic devices 429 to connect to, preferred power modes 430 of operation, preferred authenticating technologies 431, preferred presence scanning duty cycles 433, preferred methods of connection 434, and so forth.

The one or more user preferred settings 411, one or more user preferences 412, one or more user preferred configurations 413, and/or user data 414 can include other information as well. For instance, in one or more embodiments the one or more user preferred settings 411, one or more user preferences 412, one or more user preferred configurations 413, and/or user data 414 comprises virtual private network communication preferences 435 and credentials 436 for communication with other electronic devices across a network.

In one or more embodiments, the one or more user preferred settings 411, one or more user preferences 412, one or more user preferred configurations 413, and/or user data 414 comprises subscriber identification module information 437 that allows the electronic device to which the companion electronic device 204 is coupled to transmit and receive voice calls, transmit and receive text messages, and otherwise use data from a subscription plan purchased by the authorized user of the companion electronic device. The one or more user preferred settings 411, one or more user preferences 412, one or more user preferred configurations 413, and/or user data 414 can also comprise credentials 438 used to access services in the "cloud." For example, the credentials 438 stored in the encrypted memory 405 could allow the electronic device to which the companion electronic device 204 is coupled to access to accounts, application, data, and services stored on a remote server across a network in one or more embodiments. These examples of what can be stored in the encrypted memory 405 are illustrative only. Numerous others will be obvious to those of ordinary skill in the art having the benefit of this disclosure. For example, the one or more user preferred settings 411, one or more user preferences 412, one or more user preferred configurations 413, and/or user data 414 can include contextual preferences 439 used to prioritize which actuation signals are delivered to the communication interface 415 as previously described, active web browser pages, web browser bookmarks 440, or other information.

Figure 5:
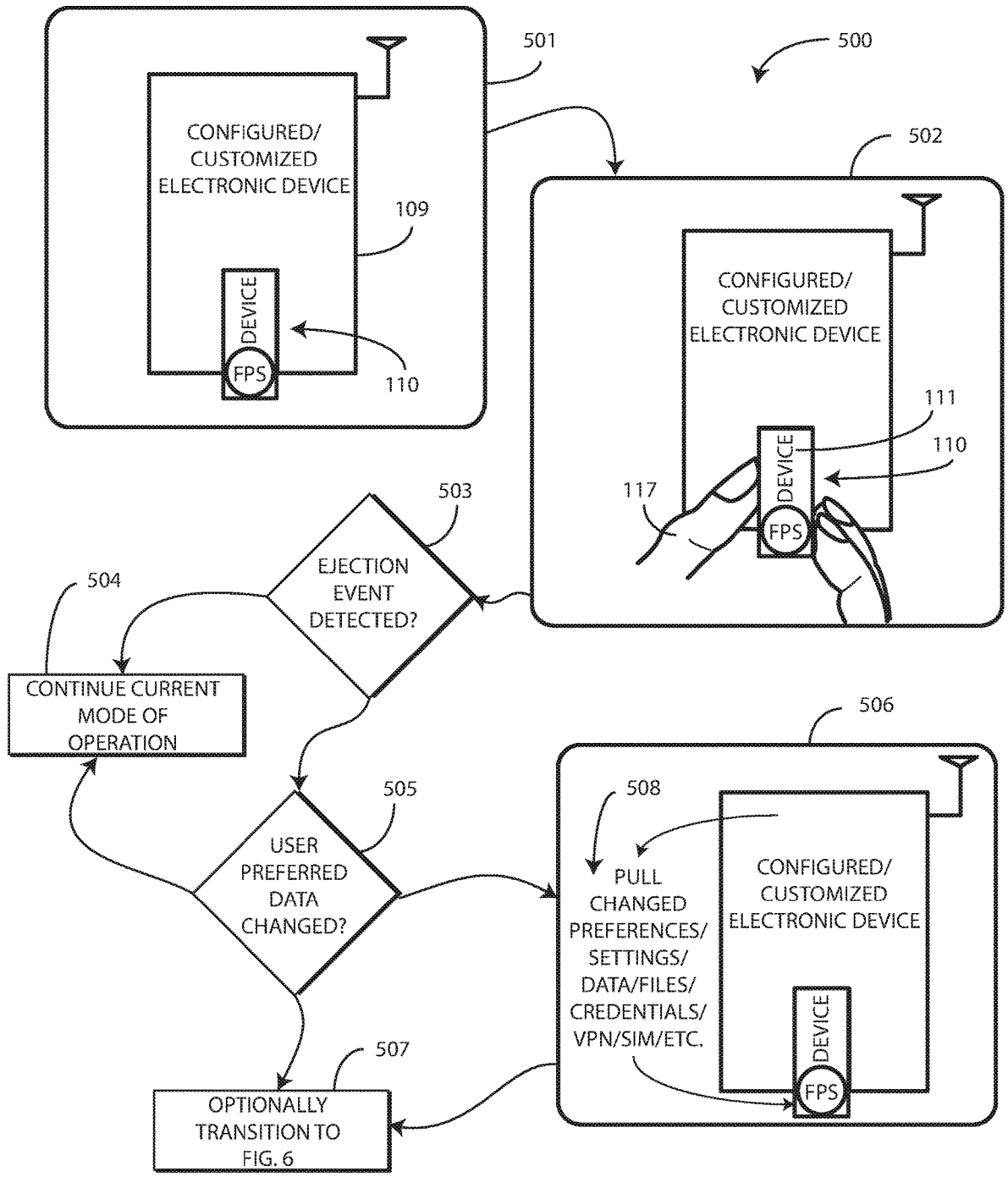
FIG. 5 illustrates another explanatory method in accordance with one or more embodiments of the disclosure.

In one or more embodiments, the companion electronic device 204 comprises an optional ejection mechanism 442 configured to facilitate decoupling and detachment of the companion electronic device 204 from another the electronic device. Illustrating by example, in one or more embodiments the touch sensor 403 is configured to be operable with the ejection mechanism 442 such that the ejection mechanism 442 detects an ejection event when a person touches the housing 207 of the companion electronic device. Turning now to FIG. 5, illustrated therein is one explanatory method 500 demonstrating how this ejection mechanism (442) can be used.

Beginning at step 501, an electronic device 109 is shown with a companion electronic device 110 coupled thereto. Accordingly, the electronic device 109 is configured and customized by the one or more user preferred settings, one or more user preferences, one or more user preferred settings, and/or user data as described above with reference to FIG. 1. Effectively, the electronic device 109 is in the same state at step 501 that the electronic device 109 was at step (108) of FIG. 1.

As shown at step 502, a user 117 then grasps the sides of the housing 111 of the companion electronic device 110. In this illustrative embodiment, the companion electronic device 110 is equipped with a touch sensor (403) operable with an ejection mechanism (442) configured to detect ejection events as was the companion electronic device (204) of FIG. 4.

Decision 503 then detects whether an ejection event is about to occur or is occurring. Where no ejection event is occurring, the electronic device 109 continues its configured and customized operation at step 504. However, as shown at step 502, an ejection event appears about to occur due to the fact that the user 117 is grasping the sides of the housing 111 of the companion electronic device 110. Accordingly, the ejection mechanism (442) determines at decision 503 that an ejection event is likely to occur. Thus, in one or more embodiments decision 503 comprises the one or more processors of the companion electronic device 110 detecting an ejection event when a touch sensor (403) operable with the one or more processors of the companion electronic device 110 detects an object, which in this case is the user's fingers, touching the housing 111 of the companion electronic device 110.

Embodiments of the disclosure contemplate that after the companion electronic device 110 has configured and customized the electronic device 109 at insertion, the user 117 may modify, alter, adjust, delete from, or add to the one or more user preferred settings, one or more user preferences, one or more user preferred settings, and/or user data initially received from the companion electronic device 204. For example, the user 117 may download a new application onto the electronic device 109 that was not included in the original one or more user preferred settings, one or more user preferences, one or more user preferred settings, and/or user data.

Whether this has occurred is determined at decision 505. In one or more embodiments, whether the one or more user preferred settings, one or more user preferences, one or more user preferred settings, and/or user data have changed is determined at decision 505 from signals received from the communication interface of the companion electronic device 110.

Where there have been changes at the electronic device 109 to the one or more user preferred settings, one or more user preferences, one or more user preferred settings, and/or user data, step 506 comprises updating the encrypted memory of the companion electronic device 110 with alterations 508 to the one or more user preferred settings, one or more user preferences, one or more user preferred settings, and/or user data and storing them in the encrypted memory of the companion electronic device 110. Thus, in one or more embodiments step 506 comprises the one or more processors of the companion electronic device 110 receiving changes and/or alterations 508 to the one or more user preferred settings, one or more user preferences, one or more user preferred settings, and/or user data from its user interface, such as its connector (112), and updating the encrypted memory of the companion electronic device 110 with those changes and/or alterations 508. The method 500 can optionally move to step (606) of the method (600) of FIG. 6 at step 507.

Figure 6:
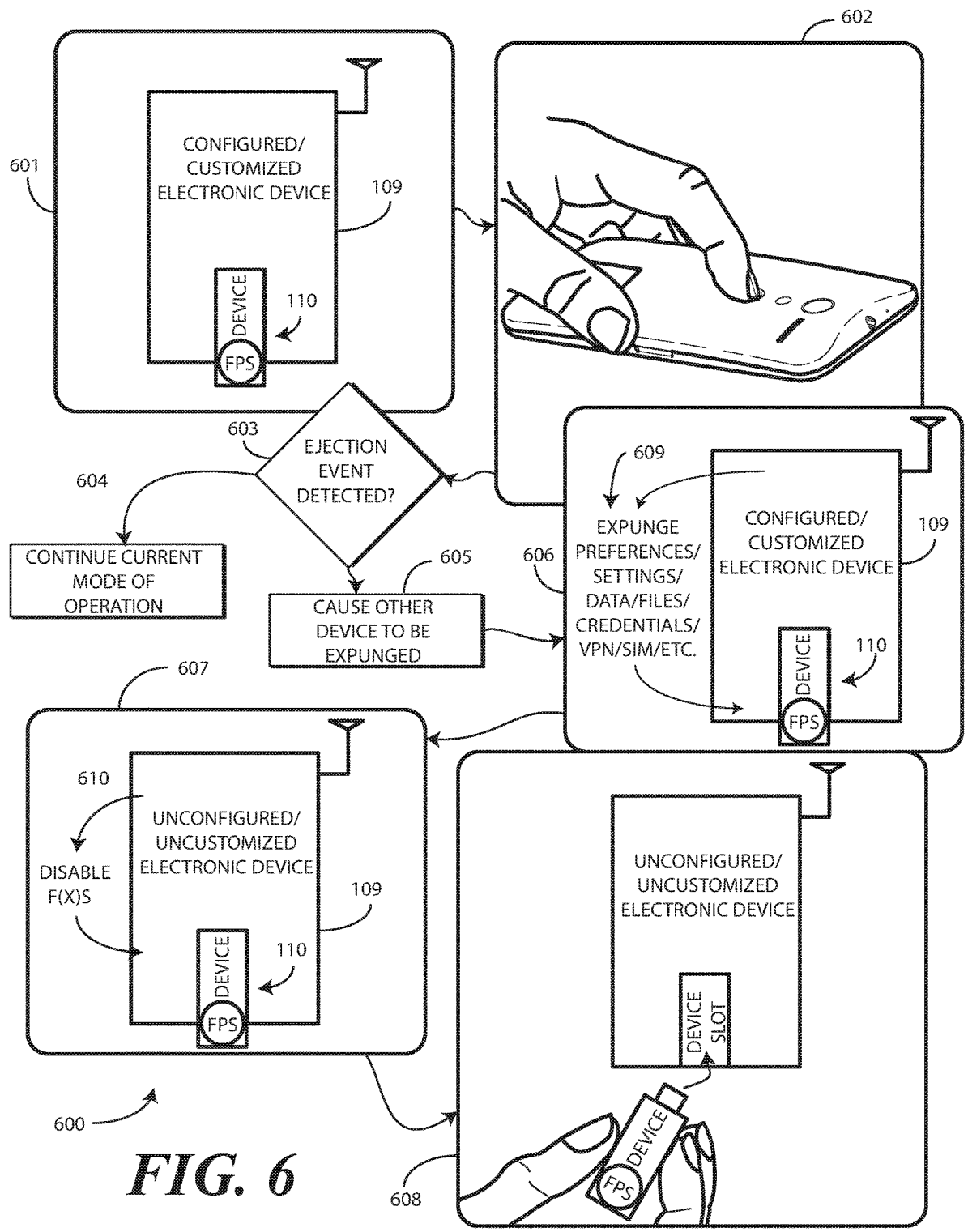
FIG. 6 illustrates yet another explanatory method in accordance with one or more embodiments of the disclosure.

Turning now to FIG. 6, illustrated therein is another method 500 in accordance with one or more embodiments of the disclosure. Beginning at step 601, an electronic device 109 is shown with a companion electronic device 110 coupled thereto. Accordingly, the electronic device 109 is configured and customized by the one or more user preferred settings, one or more user preferences, one or more user preferred settings, and/or user data as described above with reference to FIG. 1. Effectively, the electronic device 109 is in the same state at step 601 that the electronic device 109 was at step (108) of FIG. 1.

As shown at step 602, a user 117 then initiates an ejection event by pressing a user interface component 307, which in this example is a button disposed along the housing of the electronic device 109. In one or more embodiments, when this occurs, one or more processors of the electronic device 109 deliver signals to an ejection mechanism of the companion electronic device 110 indicating that an ejection event will occur.

Decision 603 then detects whether an ejection event is about to occur or is occurring from the signals received at step 602. Where no ejection event is occurring, the electronic device 109 continues its configured and customized operation at step 604. However, as shown at step 602, the one or more processors of the electronic device 109 are transmitting signals to the companion electronic device 110 in response to the user 117 interacting with the user interface component 307. Accordingly, the ejection mechanism of the companion electronic device 110 determines at decision 503 that an ejection event will soon occur. Since the ejection event will eject the companion electronic device 110 from the electronic device 109, this will cause electronic communication between the electronic device 109 and the companion electronic device 110 to cease.

Embodiments of the disclosure contemplate that after the companion electronic device 110 has configured and customized the electronic device 109 at insertion, the user 117 may not want any of the one or more user preferred settings, one or more user preferences, one or more user preferred settings, and/or user data to remain on the electronic device 109. Accordingly, in one or more embodiments, step 605 comprises the one or more processors of the companion electronic device 110 expunging the one or more user preferred settings, one or more user preferences, one or more user preferred settings, and/or user data upon detecting the initiation of an ejection event that will decouple the companion electronic device 110 from the electronic device 109.

As shown at step 606, in one or more embodiments the one or more processors of the companion electronic device 110 cause the deletion 609 of the one or more user preferred settings, one or more user preferences, one or more user preferred settings, and/or user data upon detecting the ejection event discontinuing electronic communication between the companion electronic device 110 and the electronic device 109. In one or more embodiments, step 607 comprises the one or more processors of the companion electronic device 110 causing 610 the one or more functions enabled on the electronic device 109 by the initial delivery of the one or more user preferred settings, one or more user preferences, one or more user preferred settings, and/or user data to be disabled in response to detecting the ejection event causing a discontinuation of one or both of electronic communication between the electronic device 109 and the companion electronic device 110 and/or power delivery from the electronic device 109 to the companion electronic device 110. This results in the electronic device 109 returning to its unconfigured and uncustomized state, just as was the case at step (101) of FIG. 1. The user 117 can then remove the companion electronic device 110 from the electronic device 109 at step 608, confident that all one or more user preferred settings, one or more user preferences, one or more user preferred settings, and/or user data has been wiped from the electronic device 109 and all functions enabled by the one or more user preferred settings, one or more user preferences, one or more user preferred settings, and/or user data have been disabled.

It should be noted that the method 600 of FIG. 6 is optional. For example, where the electronic device 109 is not a public electronic device, or is otherwise designated as belonging to the authorized user of the companion electronic device 110, in one or more embodiments the user preferred settings, data, files, preferences, applications, application suites, and so forth can be allowed to remain on the other electronic device. Thus, the method 600 of FIG. 6 could be omitted. The user 117 may designate the electronic device 109 as a privately owned device if, for example, it is located in their home. Alternatively, the user 117 may designate the electronic device 109 as a private device with an identification code that allows the one or more user preferred settings, one or more user preferences, one or more user preferred settings, and/or user data to remain operable on the electronic device 109 when the companion electronic device 110 is ejected in one or more embodiments. Where the electronic device 109 is designated as belonging to the user 117, in one or more embodiments the electronic device 109 can create a checkpoint or restore point of the one or more user preferred settings, one or more user preferences, one or more user preferred settings, and/or user data stored in the companion electronic device 110 such that this information can be recovered if the companion electronic device 110 is lost or stolen.

Figure 7:
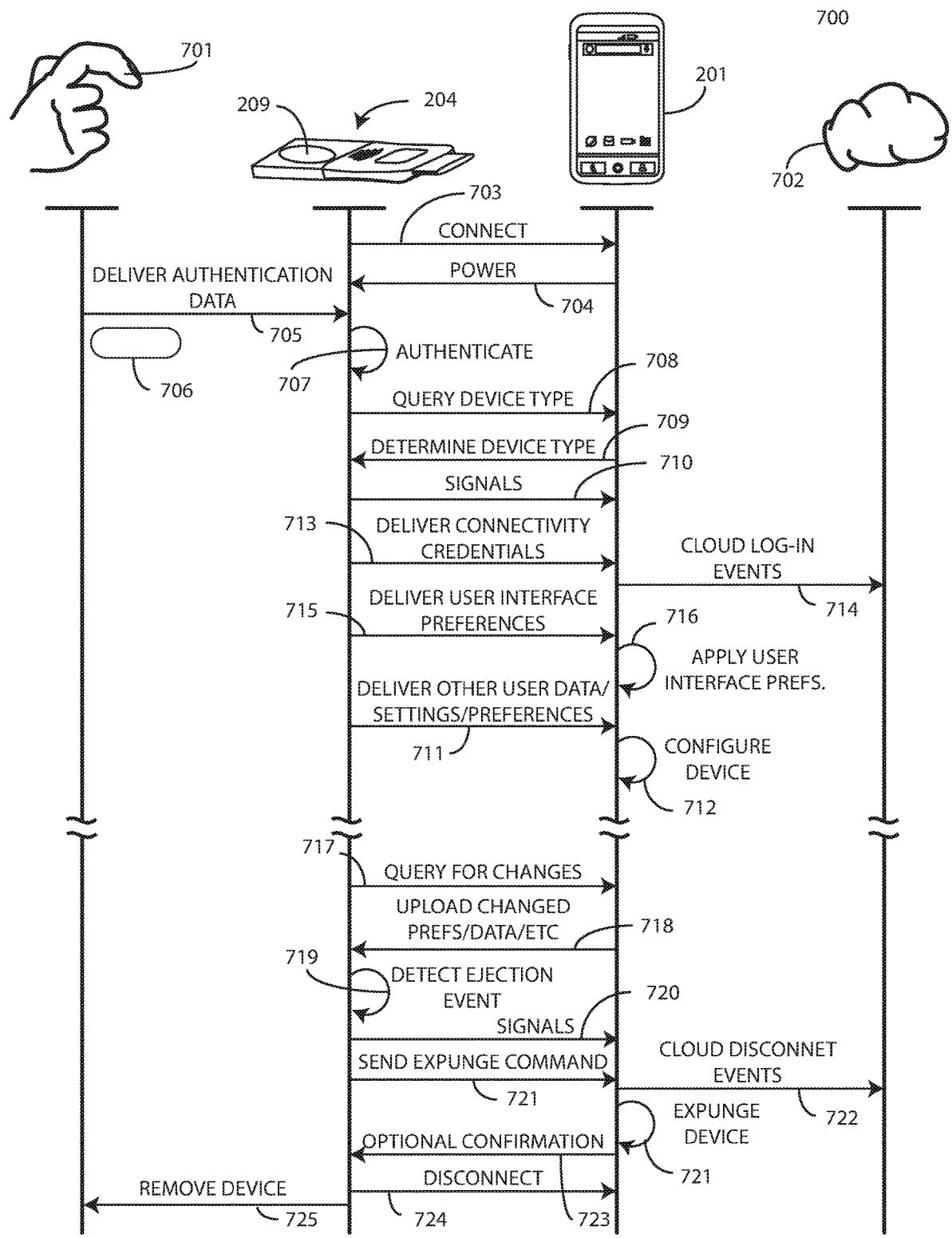
FIG. 7 illustrates one explanatory system, method, and signal flow diagram in accordance with one or more embodiments of the disclosure.

Turning now to FIG. 7, illustrated therein is one explanatory system, method, and signal flow diagram 700 in accordance with one or more embodiments of the disclosure. Represented in the system, method, and signal flow diagram 700 are an authorized user 701 of a companion electronic device 204, the companion electronic device 204, an electronic device 201 to which the companion electronic device 204 can be electrically and/or mechanically coupled, and one or more cloud services and systems 702 with which the companion electronic device 204 can communicate. The one or more cloud services and systems 702 generally represent one or more remote servers, computers, and devices that are networked together to operate as a single ecosystem. These one or more remote servers, computers, and devices can be configured to store data, manage data, run applications, deliver content, and perform other functions across the network.

Initially, a communication interface of the companion electronic device 204 is electrically coupled 703 to a communication interface of the electronic device 201. In one or more embodiments, one or more processors of the companion electronic device 204 are then actuated by power 704 received from the electronic device 201 through the communication interface establishing electronic communication between the electronic device 201 and the companion electronic device 204.

The authorized user 701 then delivers 705 fingerprint data 706 to the fingerprint sensor 209 of the companion electronic device 204. An authentication device or one or more processors of the companion electronic device 204 then confirm 707 whether the fingerprint data 706 belongs to the authorized user 701 of the companion electronic device 204.

In one or more embodiments, the one or more processors of the companion electronic device 204 then query the electronic device 201 to determine 709 what type of device the electronic device 201 is by delivering signals to the communication interface between the electronic device 201 and the companion electronic device 204, determining the same from signals received from the communication interface between the electronic device 201 and the companion electronic device 204.

The one or more processors of the companion electronic device 204 then deliver 710 signals to the communication interface established between the electronic device 201 and the companion electronic device 204. In one or more embodiments, the one or more processors of the companion electronic device 204 deliver 710 the signals to the communication interface established between the electronic device 201 and the companion electronic device 204 upon confirming 707 the fingerprint data 706 received by the fingerprint sensor 209 belongs to the authorized user 701 of the companion electronic device 204.

In one or more embodiments, the signals delivered 710 to the communication interface established between the electronic device 201 and the companion electronic device 204 comprise one or more of one or more user preferred settings, one or more user preferences, one or more user preferred settings, and/or user data stored in an encrypted memory of the companion electronic device 204. For example, in one or more embodiments the one or more processors of the companion electronic device 204 automatically deliver 711 one or more user preferred settings to the communication interface established between the electronic device 201 and the companion electronic device 204 upon the one or more processors of the companion electronic device 204 confirming 707 that the fingerprint data 706 received by the fingerprint sensor 209 belongs to the authorized user 701 of the companion electronic device 204. These one or more user preferred settings can include a ringtone preference, a font size preference, an audio setting preference, a call handling preference, a data preference, a screen brightness preference, or an application suite preference. Other examples of user preferred settings will be obvious to those of ordinary skill in the art having the benefit of this disclosure. In effect, the one or more processors of the companion electronic device 204 configure 712 the electronic device 201 with the various user preferred settings when the companion electronic device 204 is coupled to the electronic device 201 and the fingerprint data 706 is identified or confirmed 707 as belonging to the authorized user 701 of the companion electronic device 204.

In one or more embodiments, the one or more processors of the companion electronic device 204 can also deliver 713 one or more authorization credentials allowing the electronic device 201 to access one or more services, such as one or more services from the one or more cloud services or systems 702. In one or more embodiments, the one or more processors of the companion electronic device 204 automatically deliver 713 the one or more authorization credentials to the communication interface established between the electronic device 201 and the companion electronic device 204 upon the one or more processors of the companion electronic device 204 confirming 707 the fingerprint data 706 received by the fingerprint sensor 209 belongs to the authorized user 701 of the companion electronic device 204. In one or more embodiments, the one or more authorization credentials automatically cause 714 one or more login events connecting the electronic device 201 to one or more cloud based services, e.g., the one or more cloud services or systems 702, across a network. Similarly, the one or more authorization credentials can comprise one or more of virtual private network credentials, subscriber identification module credentials, or other types of credentials as well.

In one or more embodiments, the one or more processors of the companion electronic device 204 also deliver 715 one or more user interface preferences to the electronic device 201. In one or more embodiments, these one or more user interface preferences can be automatically applied 716 to configure and customize the electronic device 201.

As the authorized user 701 uses the electronic device 201, it is contemplated that there will be situations in which the authorized user 701 modifies the one or more user preferred settings, one or more user preferences, one or more user preferred settings, and/or user data at the electronic device 201. Accordingly, periodically the one or more processors of the companion electronic device 204 may query 717 the electronic device 201 for changes, alterations, additions to, deletions from, substitutions for, or other modifications of the one or more user preferred settings, one or more user preferences, one or more user preferred settings, and/or user data. In one or more embodiments, where such alterations are made, as detected from signals received from the communication interface established between the companion electronic device 204 and the electronic device 201, the one or more processors of the companion electronic device 204 can receive 718 one or more changes or alterations to the one or more user preferred settings, one or more user preferences, one or more user preferred settings, and/or user data and update the encrypted memory of the companion electronic device 204 with the changes or alterations to the one or more user preferred settings, one or more user preferences, one or more user preferred settings, and/or user data.

In one or more embodiments, the one or more processors of the companion electronic device 204 can detect 719 an ejection event that one or more of physically decouples the companion electronic device 204 from the electronic device 201, interrupts the communication interface established between the companion electronic device 204 and the electronic device, electrically decouples the companion electronic device 204 from the electronic device 201, interrupts the delivery of power from the electronic device 201 to the companion electronic device to actuate the one or more processors of the companion electronic device, or combinations thereof. In one or more embodiments, where this occurs the one or more processors of the companion electronic device 204 send 720 signals to the electronic device 201 causing one or both of the one or more user preferred settings, one or more user preferences, one or more user preferred settings, and/or user data to be expunged from the electronic device 201 and/or any functions enabled by the one or more user preferred settings, one or more user preferences, one or more user preferred settings, and/or user data on the electronic device 201 to be disabled. The electronic device 201 can then execute 721 operations to expunge the one or more user preferred settings, one or more user preferences, one or more user preferred settings, and/or user data and/or disable any functions enabled by the one or more user preferred settings, one or more user preferences, one or more user preferred settings, and/or user data. Optionally, the electronic device 201 can disconnect 722 access to any cloud services as well.

An optional confirmation that the companion electronic device 204 is ready to be removed from the electronic device 723 can then be sent, with a disconnection 724 of the communication interface between the electronic device 201 and the companion electronic device 204 occurring there-after. The authorized user 701 can then remove 725 the companion electronic device 204 from the electronic device 201.

Figure 8:
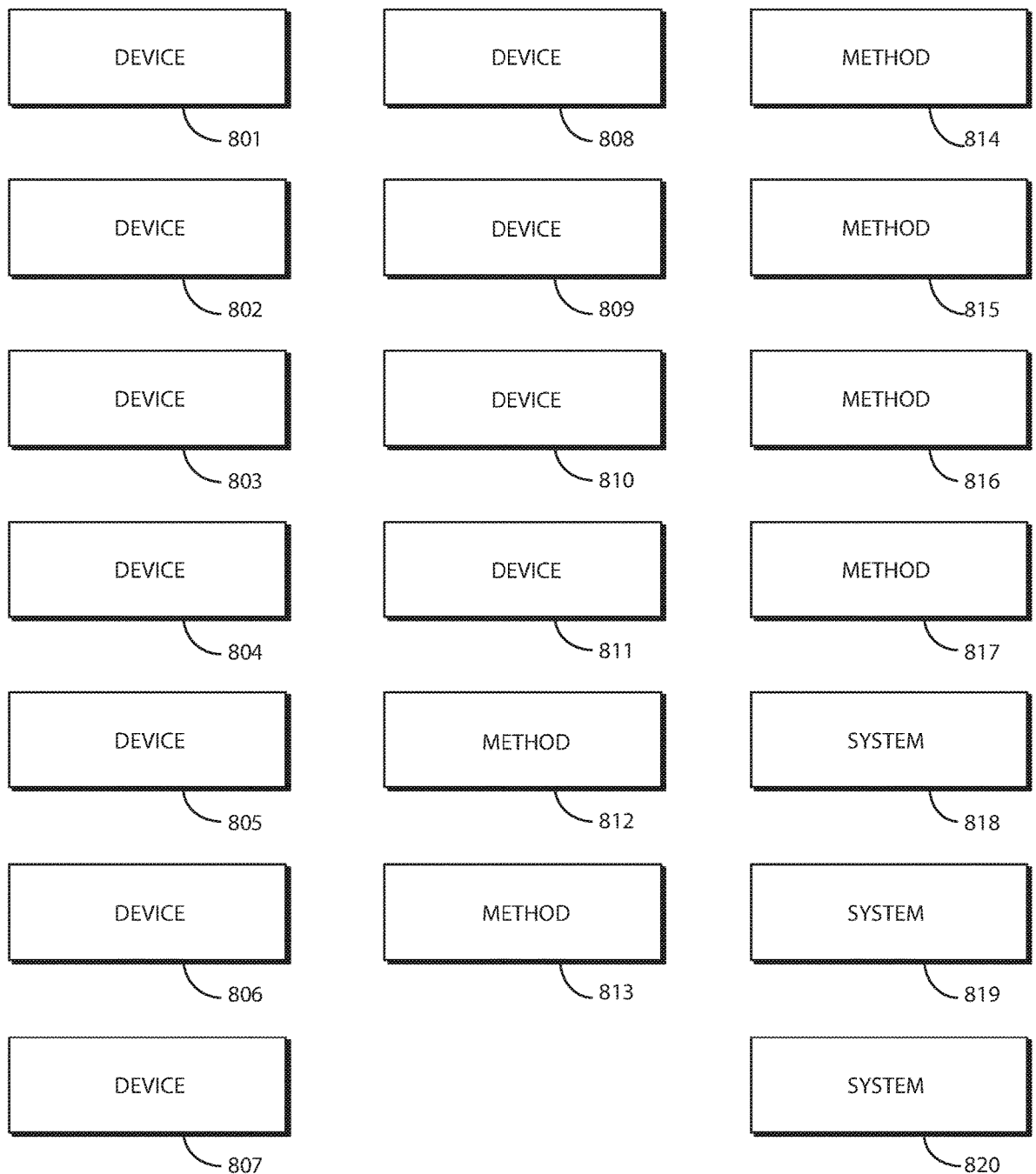
FIG. 8 illustrates various embodiments of the disclosure.

Turning now to FIG. 8, illustrated therein are various embodiments of the disclosure. At 801, a companion electronic device comprises a communication interface. At 801, the companion electronic device comprises one or more processors operable with the communication interface. At 801, the companion electronic device comprises a fingerprint sensor operable with the one or more processors.

At 801, the one or more processors are actuated by power received from the communication interface upon the communication interface establishing electronic communication with another electronic device. At 801, the one or more processors of the companion electronic device deliver signals to the communication interface. At 801, the signals enable one or more functions of the other electronic device upon confirming fingerprint data received by the fingerprint sensor after the one or more processors are actuated belongs to an authorized user of the device.

At 802, the companion electronic device of 801 further comprises an encrypted memory operable with the one or more processors. At 802, the encrypted memory stores one or more user preferred settings for the one or more functions of the other electronic device. At 803, the one or more processors of 802 automatically deliver the one or more user preferred settings to the communication interface upon the one or more processors confirming the fingerprint data received by the fingerprint sensor belongs to the authorized user of the device. At 804, the one or more user preferred settings of 803 comprise one or more of a ringtone preference, a font size preference, a screen brightness preference, or an application suite preference.

At 805, the one or more processors of 803 deliver actuation signals to the communication interface. At 805, the actuation signals actuate at least one function of the one or more functions of the other electronic device after delivery of the one or more user preferred settings to the communication interface. At 806, the one or more processors of 803 cause deletion of the one or more user preferred settings upon detecting an ejection event discontinuing the electronic communication with the other electronic device.

At 807, the encrypted memory of 803 stores one or more authorization credentials allowing the another electronic device to access one or more services. At 807, the one or more processors automatically deliver the one or more authorization credentials to the communication interface upon the one or more processors confirming the fingerprint data received by the fingerprint sensor belongs to the authorized user of the companion electronic device. At 808, the one or more authorization credentials of 807 automatically cause a login event connecting the other electronic device to one or more cloud-based services across a network. At 809, the one or more authorization credentials of 807 comprise one or more of virtual private network credentials or subscriber identification module credentials.

At 810, the encrypted memory of 802 further store one or more user files. At 810, the one or more processors automatically deliver the one or more user files to the communication interface upon the one or more processors confirming the fingerprint data received by the fingerprint sensor belongs to the authorized user of the companion electronic device.

At 811, the one or more processors of 802 detect, from other signals received from the communication interface, alterations of the one or more user preferred settings. At 811, the one or more processors update the encrypted memory with the alterations of the one or more user preferred settings.

At 812, a method comprises receiving, at a connector of a companion electronic device, power actuating one or more processors of the device. At 812, the method comprises receiving, at an authentication device operable with the one or more processors, authentication data.

At 812, the method comprises confirming, by the one or more processors, the authentication data is received from an authorized user of the device. At 812, the method comprises automatically delivering, by the one or more processors from an encrypted memory after confirming the authentication data is received from the authorized user of the device, one or more user preferences to the connector. At 812, the one or more user preferences enable one or more functions of another electronic device only while the power actuating the one or more processors is received from the connector.

At 813, the one or more processors of 812 cause the one or more functions of the other electronic device to be disabled upon detecting an ejection event causing cessation of delivery of the power actuating the one or more processors to the connector. At 814, the one or more processors of 813 detect the ejection event when a touch sensor operable with the one or more processors detects an object touching the companion electronic device.

At 815, the one or more processors of 813 receive one or more changes to the user preferences from the connector and update the encrypted memory with the one or more changes. At 816, the method of 813 further comprises the one or more processors delivering signals to the connector causing a predefined application suite to be loaded on the other electronic device. At 817, the method of 813 further comprises delivering signals to the connector causing actuation of one or more predefined applications on the other electronic device, with the actuation occurring as a function of an operating context of the other electronic device.

At 818, a system comprises an electronic device and an companion electronic device that is electrically connectable to the electronic device. At 818, the companion electronic device comprises a fingerprint sensor and an encrypted memory storing a plurality of user preferred settings for the electronic device. At 818, the companion electronic device comprises one or more processors operable with the fingerprint sensor and the encrypted memory. At 818, the one or more processors configure the electronic device with the plurality of user preferred settings when the companion electronic device is coupled to the electronic device and fingerprint data received by the fingerprint sensor is identified as belonging to an authorized user of the companion electronic device.

At 819, the one or more processors of 818 expunge the plurality of user preferred settings from the electronic device upon detecting an initiation of an ejection event decoupling the companion electronic device from the electronic device. At 820, the electronic device of 819 comprises one or more generic functions operable without the plurality of user preferred settings. At 820, the one or more processors cause only the one or more generic functions to be operable when the one or more processors fail to identify the fingerprint data as belonging to the authorized user of the companion electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A companion electronic device, comprising:
   a communication interface;
   one or more processors operable with the communication interface;
   an encrypted memory; and
   a fingerprint sensor operable with the one or more processors;
   the one or more processors:
     actuated by power received from the communication interface upon the communication interface establishing electronic communication with another electronic device; and
     delivering signals to the communication interface, the signals enabling one or more functions of the another electronic device upon confirming fingerprint data received by the fingerprint sensor after the one or more processors are actuated belongs to an authorized user of the companion electronic device;
   the encrypted memory storing one or more user preferred settings for one or more functions of the another electronic device;
   the one or more processors automatically delivering the one or more user preferred settings to the communication interface upon the one or more processors confirming the fingerprint data received by the fingerprint sensor belongs to the authorized user of the companion electronic device; and
   further comprising a locking mechanism operable to retain the companion electronic device in a connected and coupled configuration attached to the another electronic device, the one or more processors delivering actuation signals to the communication interface, the actuation signals actuating at least one function of the one or more functions of the another electronic device after delivering the one or more user preferred settings to the communication interface, and also generating commands to control the locking mechanism.

2. The companion electronic device of claim 1, the encrypted memory further storing one or more user files, the one or more processors automatically delivering the one or more user files to the communication interface upon the one or more processors confirming the fingerprint data received by the fingerprint sensor belongs to the authorized user of the companion electronic device.

3. The companion electronic device of claim 1, the one or more processors automatically delivering the one or more user preferred settings to the communication interface after a pre-processing step performing a primary authentication of the authorized user of the companion electronic device has been performed by the fingerprint sensor comparing the fingerprint data to a reference file stored in the encrypted memory.

4. The companion electronic device of claim 1, the one or more user preferred settings comprising preferred presence scanning duty cycles to detect whether a person is still using the another electronic device prior to the another electronic device entering a low-power or sleep mode.

5. The companion electronic device of claim 3, the encrypted memory further storing one or more authorization credentials allowing the another electronic device to access one or more services, the one or more authorization credentials automatically causing a login event connecting the another electronic device to one or more cloud-based services across a network.

6. The companion electronic device of claim 1, the one or more processors causing deletion of the one or more user preferred settings upon detecting an ejection event discontinuing electronic communication with the another electronic device.

7. The companion electronic device of claim 1, the encrypted memory further storing one or more authorization credentials allowing the another electronic device to access one or more services, the one or more processors automatically delivering the one or more authorization credentials to the communication interface upon the one or more processors confirming the fingerprint data received by the fingerprint sensor belongs to the authorized user of the companion electronic device.

8. The companion electronic device of claim 7, the companion electronic device further comprising an energy storage source for powering internal components of the companion electronic device.

9. The companion electronic device of claim 7, the one or more processors allowing the one or more functions of the another electronic device to remain operational after an ejection event decoupling and detaching the companion electronic device from the another electronic device when the another electronic device is not a public device or is designated as belonging to the authorized user of the another electronic device.

10. The companion electronic device of claim 9, the another electronic device being designated as belonging to the authorized user of the companion electronic device by way of a location in which the another electronic device is situated.

11. The companion electronic device of claim 2, the one or more processors detecting, from other signals received from the communication interface in response to initiation of an ejection event facilitating decoupling of the companion electronic device from the another electronic device, alterations of the one or more user preferred settings, and updating the encrypted memory with the alterations of the one or more user preferred settings prior to the ejection event occurring.

12. A method, comprising:
   receiving, at a connector of a companion electronic device, power actuating one or more processors of the companion electronic device;
   receiving, at an authentication device operable with the one or more processors, authentication data, the authentication data comprising fingerprint data received by a fingerprint sensor;
   confirming, by the one or more processors, the authentication data is received from an authorized user of the companion electronic device; and automatically delivering, by the one or more processors from an encrypted memory storing one or more user preferred settings for one or more functions of another electronic device after confirming the authentication data is received from the authorized user of the companion electronic device, one or more user preferences and the one or more user preferred settings to the connector, the one or more user preferences enabling one or more functions of another electronic device only while the power actuating the one or more processors is received from the connector;

further comprising buffering and processing the power received from the connector with power conversion circuitry;

delivering actuation signals to the connector, the actuation signals actuating at least one function of the one or more functions after delivery of the one or more user preferred settings; and generating commands to control a locking mechanism operable to retain the companion electronic device operable to retain the companion electronic device in a connected and coupled configuration attached to the another electronic device.

13. The method of claim 12, the one or more processors causing the one or more functions of the another electronic device to be disabled upon detecting an ejection event causing cessation of delivery of the power actuating the one or more processors to the connector.

14. The method of claim 13, the one or more processors detecting the ejection event when a touch sensor operable with the one or more processors detects an object touching the companion electronic device.

15. The method of claim 13, further comprising the one or more processors controlling a screen brightness of the another electronic device while the power actuating the one or more processors is received by the connector.

16. The method of claim 13, further comprising the one or more processors delivering signals to the connector causing a predefined application to be loaded on the another electronic device as a function of a location where the another electronic device is situated, and further delivering other signals to the connector causing another predefined application to be loaded on the another electronic device when the another electronic device changes locations.

17. The method of claim 13, further comprising delivering signals to the connector causing actuation of one or more predefined applications on the another electronic device, with the actuation occurring as a function of an operating context of the another electronic device, the operating context comprising a combination of a time of day and a location of the another electronic device.

18. A system, comprising:
an electronic device; and
a companion electronic device, electrically connectable to the electronic device, the companion electronic device comprising:
a fingerprint sensor;
an encrypted memory storing a plurality of user preferred settings for one or more functions of the electronic device;
a locking mechanism operable to retain the companion electronic device in a connected and coupled configuration attached to the electronic device; and
one or more processors operable with the fingerprint sensor, the locking mechanism, and the encrypted memory;
the one or more processors:
configuring the electronic device with the plurality of user preferred settings when the companion electronic device is coupled to the electronic device and fingerprint data received by the fingerprint sensor is identified as belonging to an authorized user of the companion electronic device bar automatically delivering user preferred settings to the electronic device;
delivering actuation signals to the electronic device actuating at least one function of the one or more functions of the electronic device after delivering the one or more user preferred settings to the electronic device;
generating commands to control the locking mechanism; and
expunging the plurality of user preferred settings from the electronic device upon detecting an initiation of an ejection event decoupling the companion electronic device from the electronic device.

19. The system of claim 18, the companion electronic device comprising a housing equipped with a touch sensor, wherein the initiation of the ejection event decoupling the companion electronic device from the electronic device comprises a user grasping the housing at locations corresponding to the touch sensor.

20. The system of claim 19, the electronic device comprising a housing having a user interface component situated thereon, wherein the initiation of the ejection event decoupling the companion electronic device from the electronic device comprises depression of the user interface component, further wherein one or more generic functions operable without the plurality of user preferred settings, the one or more processors causing only the one or more generic functions to be operable when the one or more processors fail to identify the fingerprint data as belonging to the authorized user of the companion electronic device.

* * * * *